(12) United States Patent
Nomura et al.

(10) Patent No.: US 6,661,970 B2
(45) Date of Patent: Dec. 9, 2003

(54) LENS BARREL

(75) Inventors: Hiroshi Nomura, Saitama (JP); Takamitsu Sasaki, Saitama (JP); Kazunori Ishizuka, Kanagawa (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/283,282

(22) Filed: Oct. 30, 2002

(65) Prior Publication Data

US 2003/0081948 A1 May 1, 2003

(30) Foreign Application Priority Data

Oct. 31, 2001 (JP) ........................................ 2001-335564

(51) Int. Cl.[7] ............................. G03B 5/00; G03B 9/08; G03B 17/04
(52) U.S. Cl. ........................ 396/79; 396/349; 396/448; 396/451; 396/542
(58) Field of Search ........................ 396/72, 79, 85–87, 396/349, 451, 462, 448, 542; 359/694–698

(56) References Cited

U.S. PATENT DOCUMENTS

| | | | |
|---|---|---|---|
| 5,812,889 A | 9/1998 | Nomura et al. | 396/451 X |
| 5,892,999 A | 4/1999 | Nomura et al. | 396/462 |
| 6,295,412 B1 * | 9/2001 | Katano et al. | 396/349 X |
| 6,393,218 B1 * | 5/2002 | Iwasaki et al. | 396/79 |
| 6,456,791 B1 * | 9/2002 | Nishimura et al. | 396/72 |
| 6,469,841 B2 * | 10/2002 | Nomura et al. | 396/79 X |

* cited by examiner

Primary Examiner—W. B. Perkey
(74) Attorney, Agent, or Firm—Greenblum & Bernstein, P.L.C.

(57) ABSTRACT

A lens barrel includes an optical system having front and rear lens groups; a front lens frame which supports the front lens group; a rear lens frame which supports the rear lens group; a lens frame drive mechanism for driving the front and rear lens frames, and allows the rear lens frame to rotate relative to the front lens frame or move together in the optical axis direction while preventing relative rotation therebetween; a shutter unit having a shutter and a flexible printed wiring board, the shutter unit being relatively rotatable to, and movable together with, the rear lens frame in the optical axis direction; and a shutter unit guide mechanism for linearly guiding the shutter unit in the optical axis direction without rotating the shutter unit regardless of whether the rear lens frame rotates relative to the front lens frame.

11 Claims, 32 Drawing Sheets

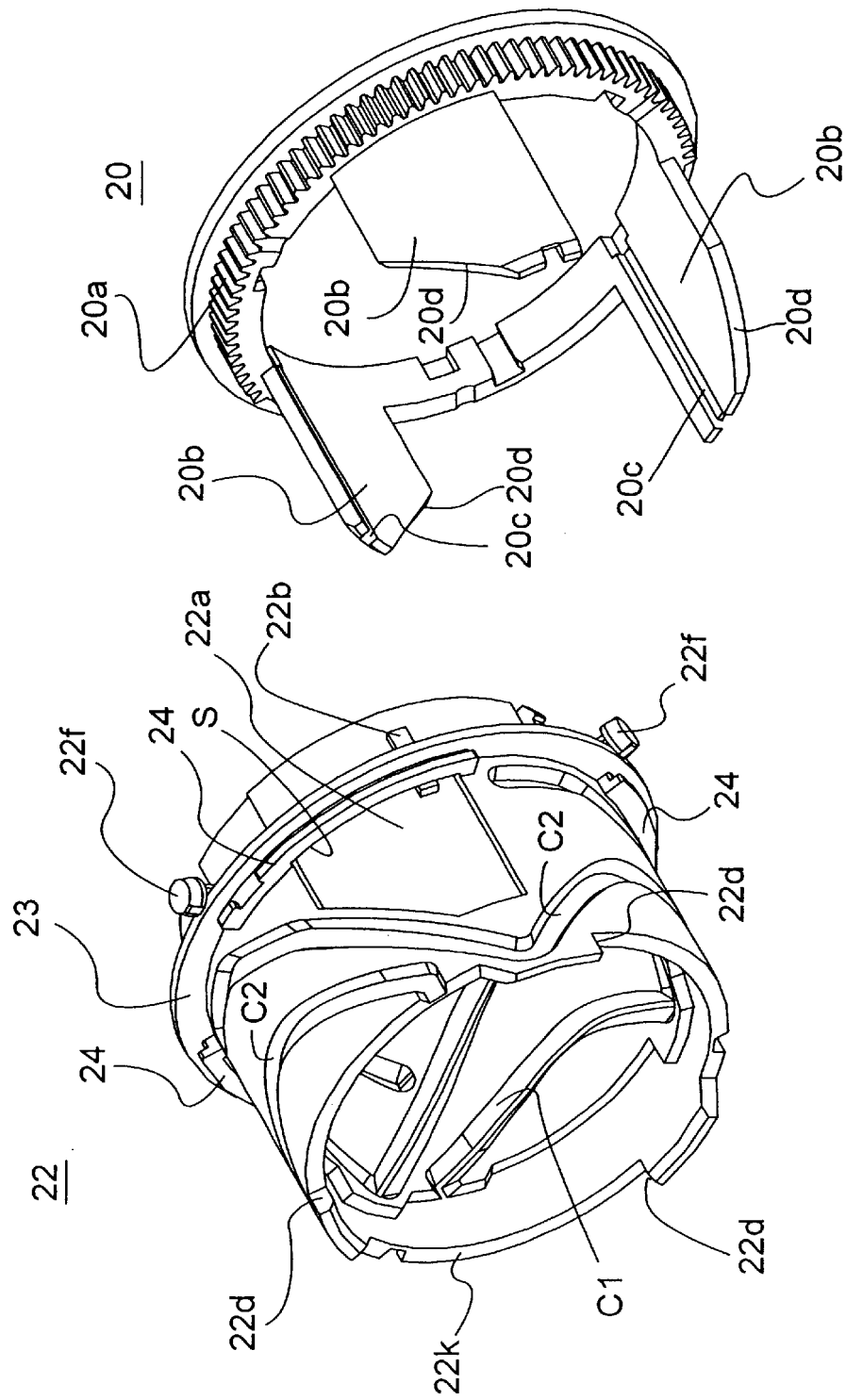

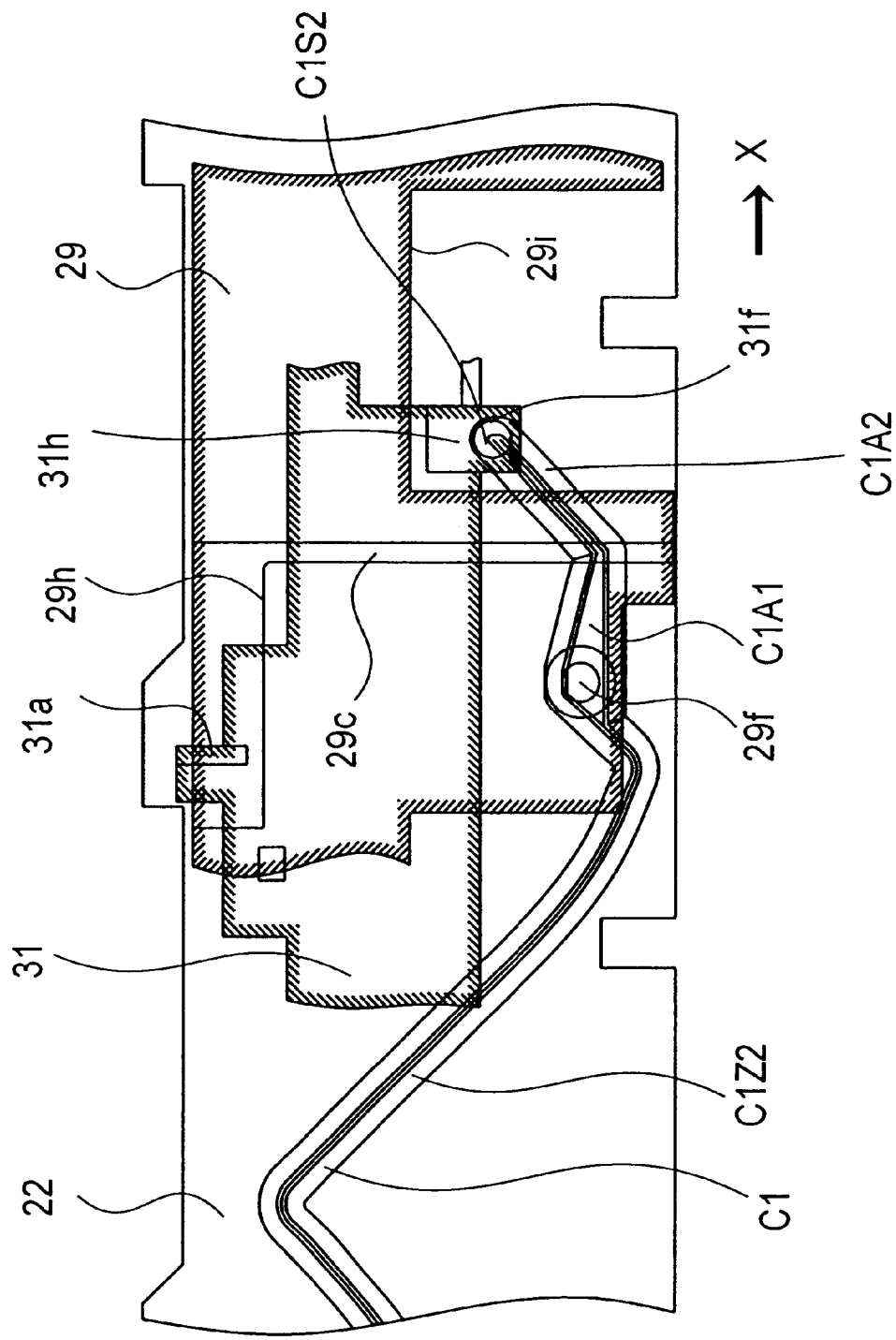

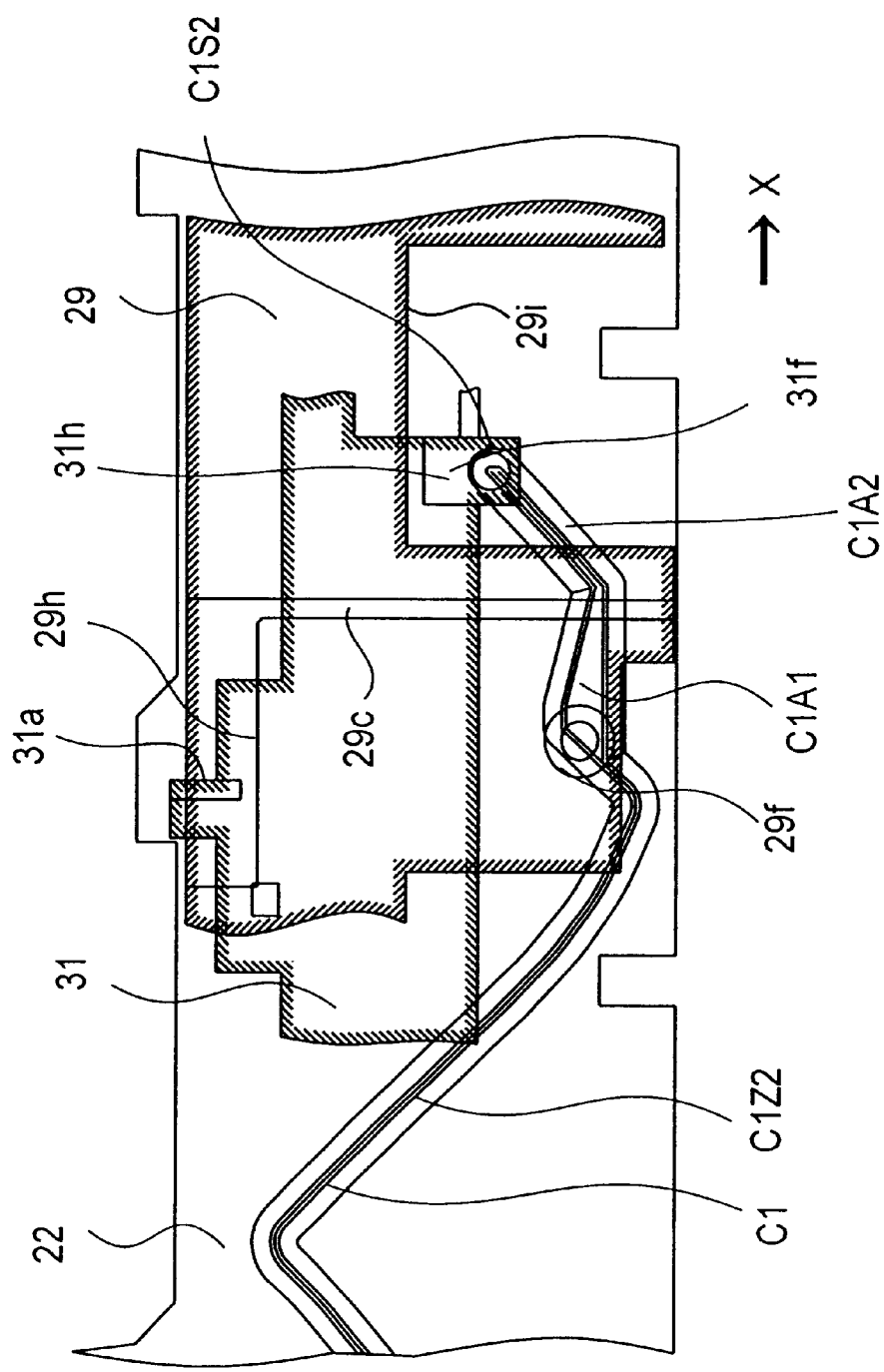

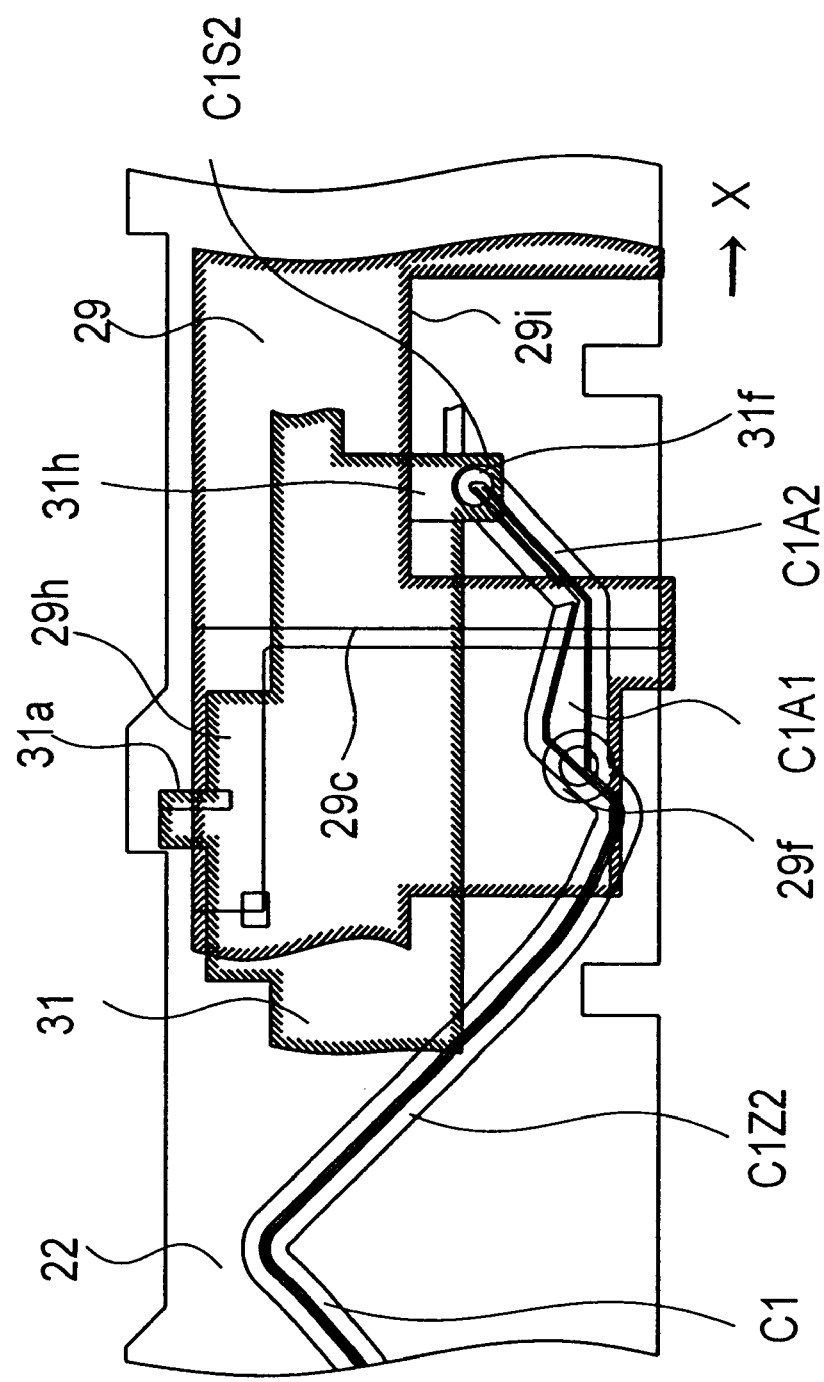

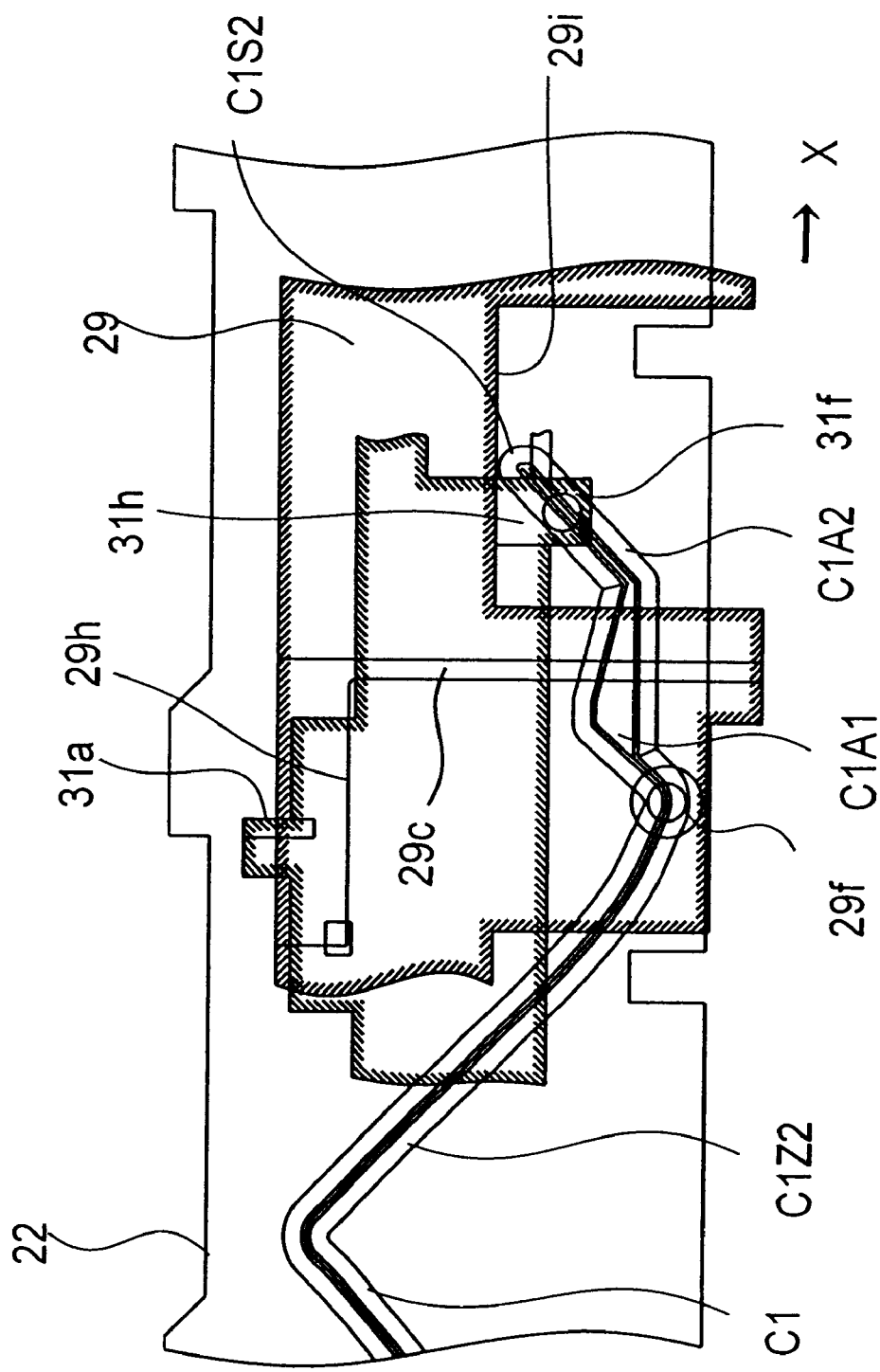

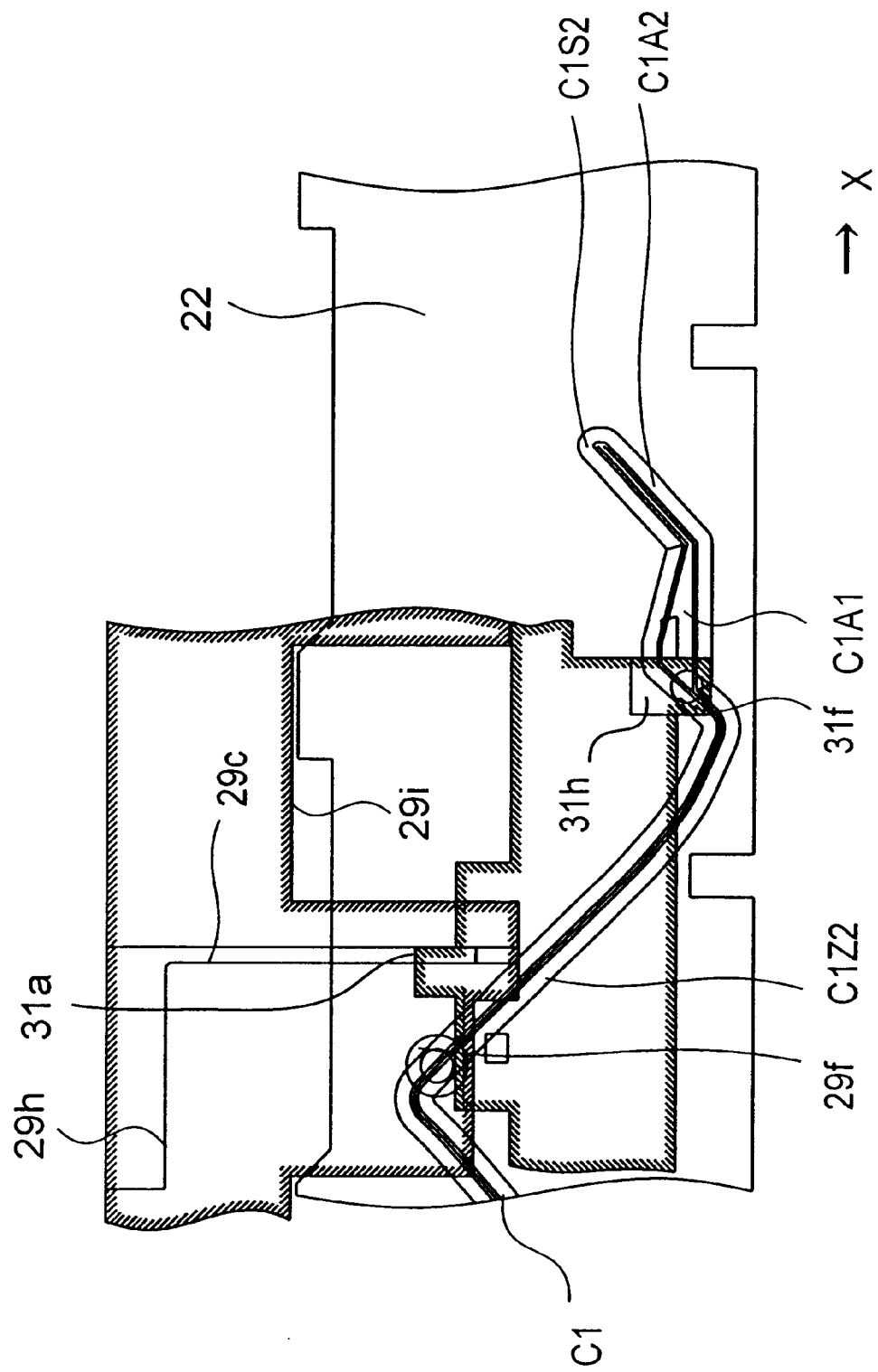

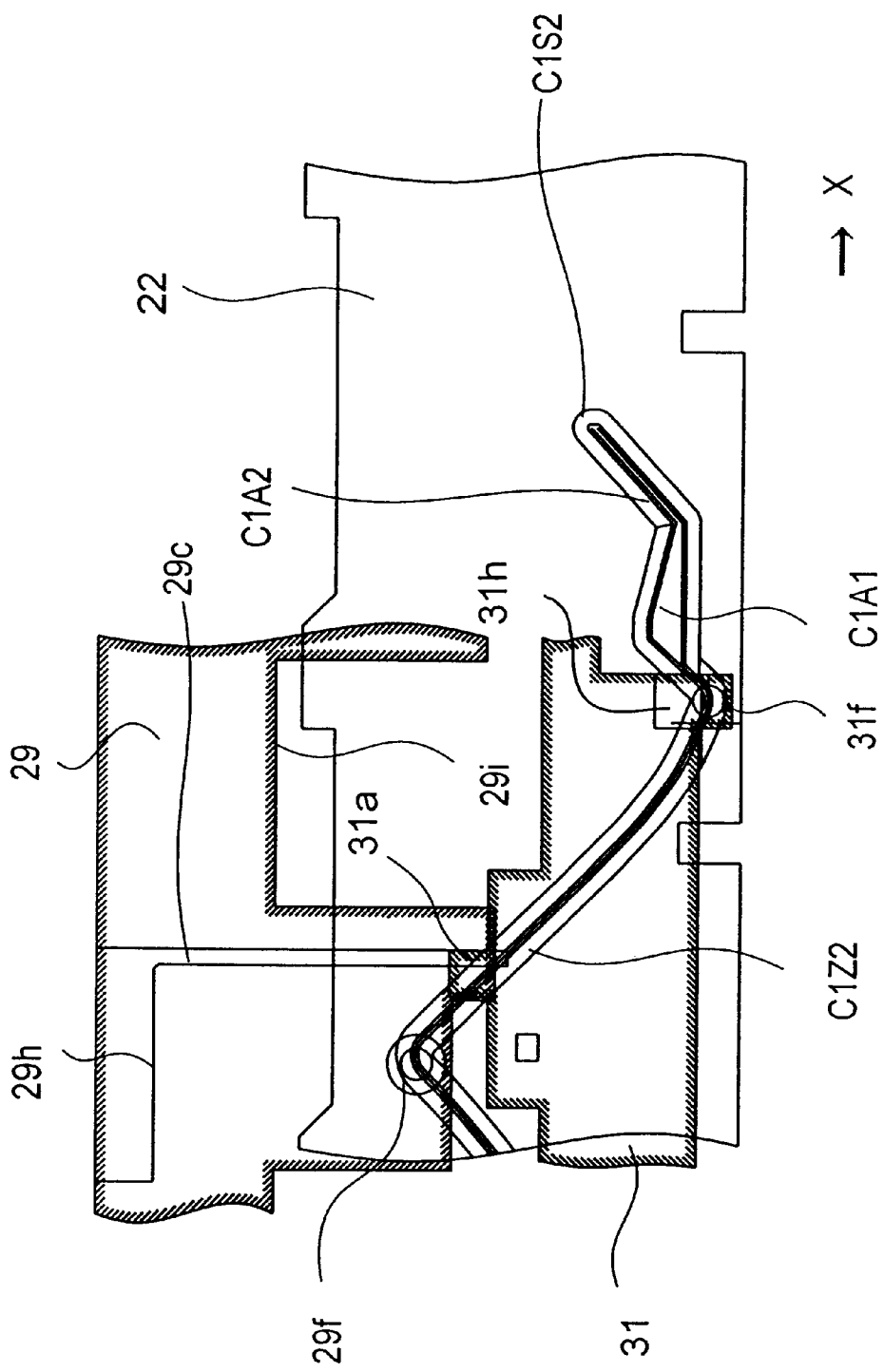

LENS BARREL

BACKGROUND OF THE INVENTION

1. Field of the Invention

The present invention relates to a lens barrel which incorporates a shutter unit having a flexible printed wiring board.

2. Description of the Related Art

In conventional lens barrels incorporating a shutter unit, the shutter unit is electrically connected to a controller for controlling the shutter unit via a flexible printed wiring board (flexible PWB), via which a drive signal is supplied from the controller to the shutter unit. Such a flexible PWB has a sufficient length to cover extension/contraction of the lens barrel if the lens barrel is of a extendable type which extends and retracts so that the length thereof is shortest at an accommodation position, and is longer at a photographing position. The flexible PWB is supported so as not to sag in the lens barrel. The flexible PWB for the shutter unit can be twisted by a certain degree in a circumferential direction of the shutter unit about the optical axis, but may be damaged or interfere with peripheral parts if twisted largely. Accordingly, it is often the case that the shutter unit having the flexible PWB is supported by a non-rotational member, e.g., a linearly-guided lens frame to be positioned therein which is guided linearly in the optical axis direction without rotating about the optical axis. Also, the shutter unit having the flexible PWB is often supported by a lens frame for supporting a lens group due to the optical design of the lens barrel.

A lens frame that supports a lens group and also the shutter unit can be made to be rotatable about the optical axis by a certain degree to obtain preferable optical performance and mechanical precision since the flexible PWB that extends from the shutter unit is flexible enough so as to be twistable by a certain amount. However, it is not desirable that the lens frame which supports the shutter unit be rotated by a large amount. Conversely, it is desirable that the rotation range of the lens frame not be restricted by the shutter unit.

It is desirable for a space around the shutter unit in the lens barrel to be utilized to miniaturize the lens barrel when the lens barrel is in an accommodation position. In this case, to prevent the shutter unit from interfering with peripheral parts, it is desirable for the shutter unit not to rotate even if the lens frame which supports the shutter unit rotates when the lens barrel is in the vicinity of the accommodation position thereof.

SUMMARY OF THE INVENTION

The present invention provides a lens barrel which supports a shutter unit having a flexible printed wiring board, wherein a large angle of rotation of a lens frame which accommodates the shutter unit can be ensured.

For example, a lens barrel is provided, including an optical system having a front lens group and a rear lens group; a front lens frame which supports the front lens group, and is guided linearly in an optical axis direction without rotating about the optical axis; a rear lens frame which supports the rear lens group; a lens frame drive mechanism for driving the front lens frame and the rear lens frame, wherein the lens frame drive mechanism allows the rear lens frame to rotate relative to the front lens frame when the front lens group and the rear lens group are in respective accommodation positions, and moves the front lens group and the rear lens group together in the optical axis direction while preventing the front lens frame and the rear lens frame from rotating relative to each other when the front lens group and the rear lens group are in respective photographing ranges excluding the respective accommodation positions; a shutter unit having a shutter and a flexible printed wiring board via which a drive signal is transmitted to the shutter, the shutter unit being positioned in the rear lens frame to be rotatable relative to the rear lens frame and to be movable together with the rear lens frame in the optical axis direction; and a shutter unit guide mechanism for linearly guiding the shutter unit in the optical axis direction without rotating the shutter unit regardless of whether the rear lens frame rotates relative to the front lens frame.

The front lens frame can be positioned around the rear lens frame, the shutter unit guide mechanism including a shutter support ring which supports the shutter unit, the shutter support ring being supported in the rear lens frame to be freely rotatable, a linear guide projection which extends outwards in a radial direction from the shutter support ring, and a linear guide groove which is formed on an inner peripheral surface of the front lens frame and in which the linear guide projection is engaged to be movable along the linear guide groove.

A front end of the rear lens frame in the optical axis direction can be open. The rear lens frame can include a movement restriction surface which restricts a rearward movement of the shutter support ring in the optical axis direction in the rear lens frame. The lens barrel can include a shutter pressure plate which is attached at the open front end of the rear lens frame to prevent the shutter unit from moving forward in the optical axis direction with respect to the rear lens frame.

The rear lens frame includes a cylindrical portion which is positioned in the rear lens frame about the optical axis, the shutter support ring having a circular aperture which is rotatably provided around an outer peripheral surface of the cylindrical portion.

The shutter support ring can include a flexible printed wiring board fixing member which supports the flexible printed wiring board. The rear lens frame can include a through-hole through which the flexible printed wiring board fixing member projects from the rear lens frame regardless of a variation in rotational position of the rear lens frame about the optical axis with respect to the front lens frame.

The optical system can include a focusing lens group positioned behind the rear group and guided in the optical axis direction, the lens barrel further including a focusing mechanism for driving the focusing lens group in the optical axis direction in accordance with object-distance information. At least a portion of the focusing mechanism enters inside a portion of the rear lens frame when the front and rear lens groups are in the respective accommodation positions. The shutter unit is formed so that the shutter unit does not interfere with the portion of the focusing mechanism when the focusing mechanism enters inside a portion of the rear lens frame.

It is desirable for the shutter unit to include a cutoff portion which enables the shutter unit not to interfere with the portion of the focusing mechanism.

It is desirable for the lens frame drive mechanism to includes a first cam follower formed on the front lens frame; a second cam follower formed on the rear lens frame; a cam ring including a cam groove in which the first cam follower and the second cam follower are engaged, the cam groove including a photographing section for moving the first cam follower and the second cam follower to move the front lens frame and the rear lens frame in the optical axis direction in the respective photographing ranges, and an accommodation section for moving the first cam follower and the second cam follower to move the front lens frame and the rear lens frame to the respective accommodation positions behind the respective photographing ranges; and a guiding mechanism, provided between the front lens frame and the rear lens frame, for allowing the rear lens frame to rotate relative to the front lens frame when the cam ring is driven to rotate with the front lens frame and the rear lens frame being in the vicinities of the respective accommodation positions thereof, respectively, and for prohibiting the rear lens frame from rotating relative to the front lens frame while allowing the rear lens frame to move only in the optical axis direction relative to the front lens frame when the cam ring is driven to rotate with the front lens frame and the rear lens frame being in the respective photographing ranges excluding the vicinities of the respective accommodation positions.

It is desirable for the front lens frame is positioned around the rear lens frame, the shutter unit guide mechanism including a shutter support ring which supports the shutter unit so that the shutter unit can freely rotate in the rear lens frame; a first linear guide projection which extends outwards in a radial direction from the shutter support ring; and a first linear guide groove which is formed on in an inner peripheral surface of the front lens frame the first linear guide projection being engaged in the linear guide projection to be movable along the first linear guide groove. The guiding mechanism can include a second linear guide groove formed on the front lens frame to extend parallel to the optical axis, a front end of the second linear guide groove being formed as a wide-width engaging portion having a greater width than another portion of the second linear guide groove in a circumferential direction of the front lens frame; and a second linear guide projection formed on the rear lens frame to be engaged in the wide-width engaging portion and the another portion of the second linear guide groove when the front lens frame and the rear lens frame are in the vicinities of the respective accommodation positions thereof and in the respective photographing ranges, respectively. The first linear guide groove and the second linear guide groove are formed on an inner peripheral surface of the front lens frame at different circumferential positions thereon.

It is desirable for the rear lens frame to rotate with a rotation of the cam ring when positioned in the vicinity of the accommodation position thereof.

It is desirable for the lens barrel to include a zoom lens barrel, wherein the lens frame drive mechanism moves the front lens group and the rear lens group to perform a zooming operation in the photographing ranges.

The present disclosure relates to subject matter contained in Japanese Patent Application No. 2001-335564 (filed on Oct. 31, 2001) which is expressly incorporated herein by reference in its entirety.

BRIEF DESCRIPTION OF THE DRAWINGS

The present invention will be described below in detail with reference to the accompanying drawings in which:

FIG. 11A is an enlarged perspective view of the cam ring;

FIG. 11B is an enlarged perspective view of a rotational ring shown in FIG. 1;

FIGS. 21A through 21J are developed perspective diagrams of the cam ring, a first lens group moving frame and the second lens group moving frame which are associated with one another, showing their positional relationships, step by step, in the case where the cam ring rotates from the accommodation position to the wide-angle extremity;

DESCRIPTION OF THE PREFERRED EMBODIMENT

Figure 1:
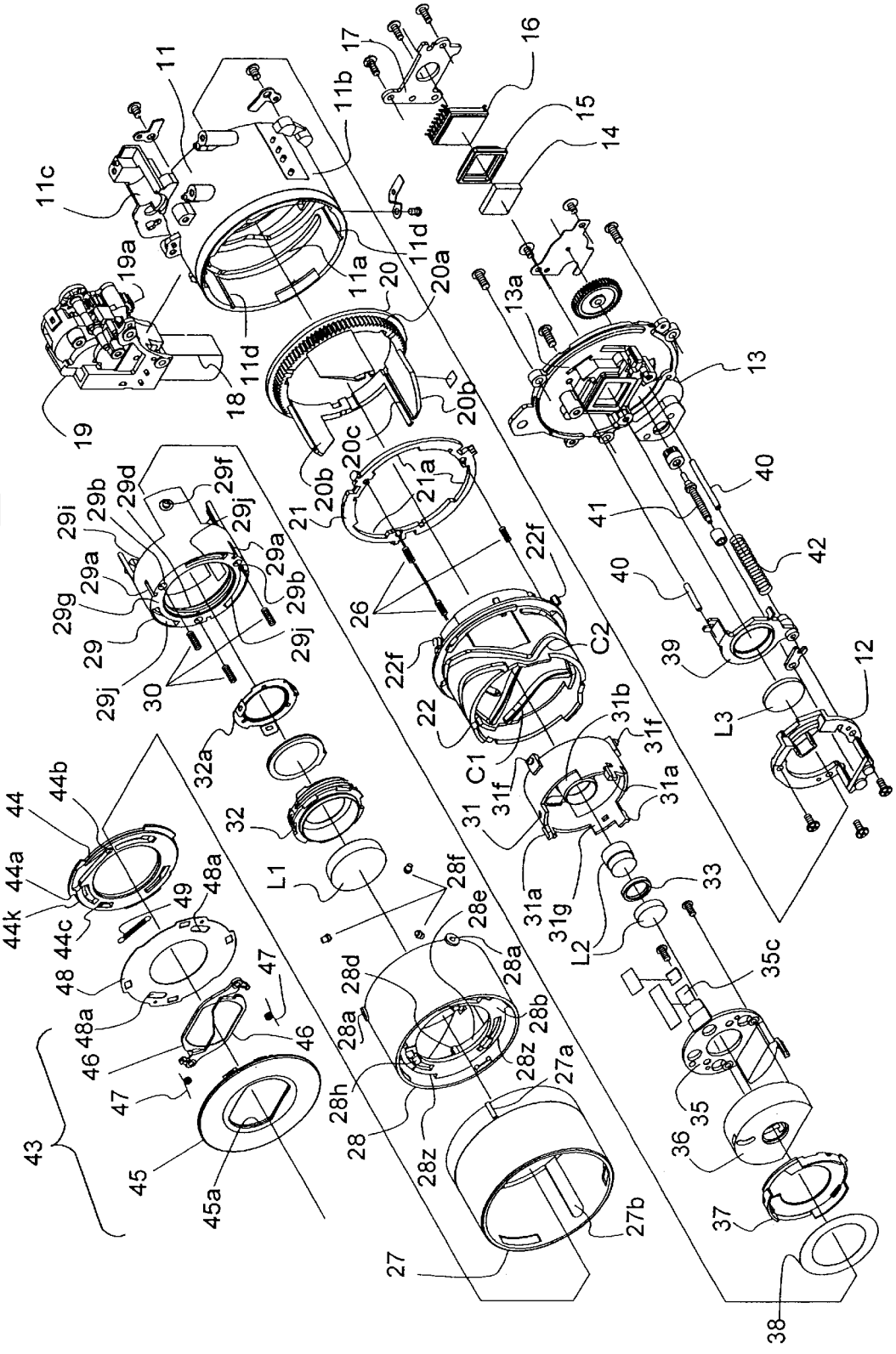
FIG. 1 is an exploded perspective view of an embodiment of a zoom lens barrel according to the present invention.

The illustrated embodiment of a zoom lens barrel, an exploded perspective view of which is shown in FIG. 1, is a telescoping zoom lens barrel of a digital camera.

Figure 8:
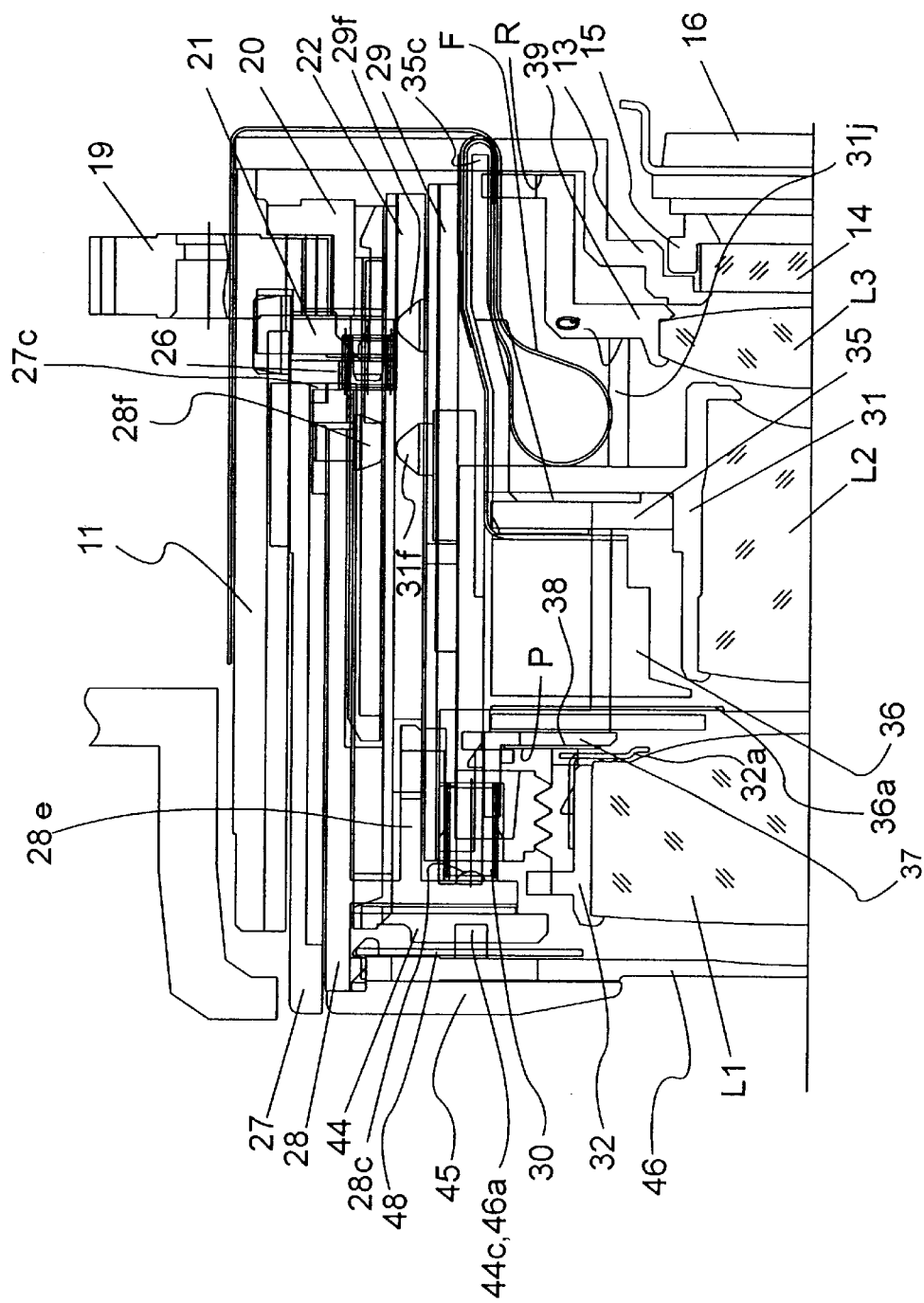
FIG. 8 is an axial cross sectional view of the zoom lens barrel shown in FIG. 1, above the optical axis, showing the zoom lens barrel in an accommodation position.
Figure 9:
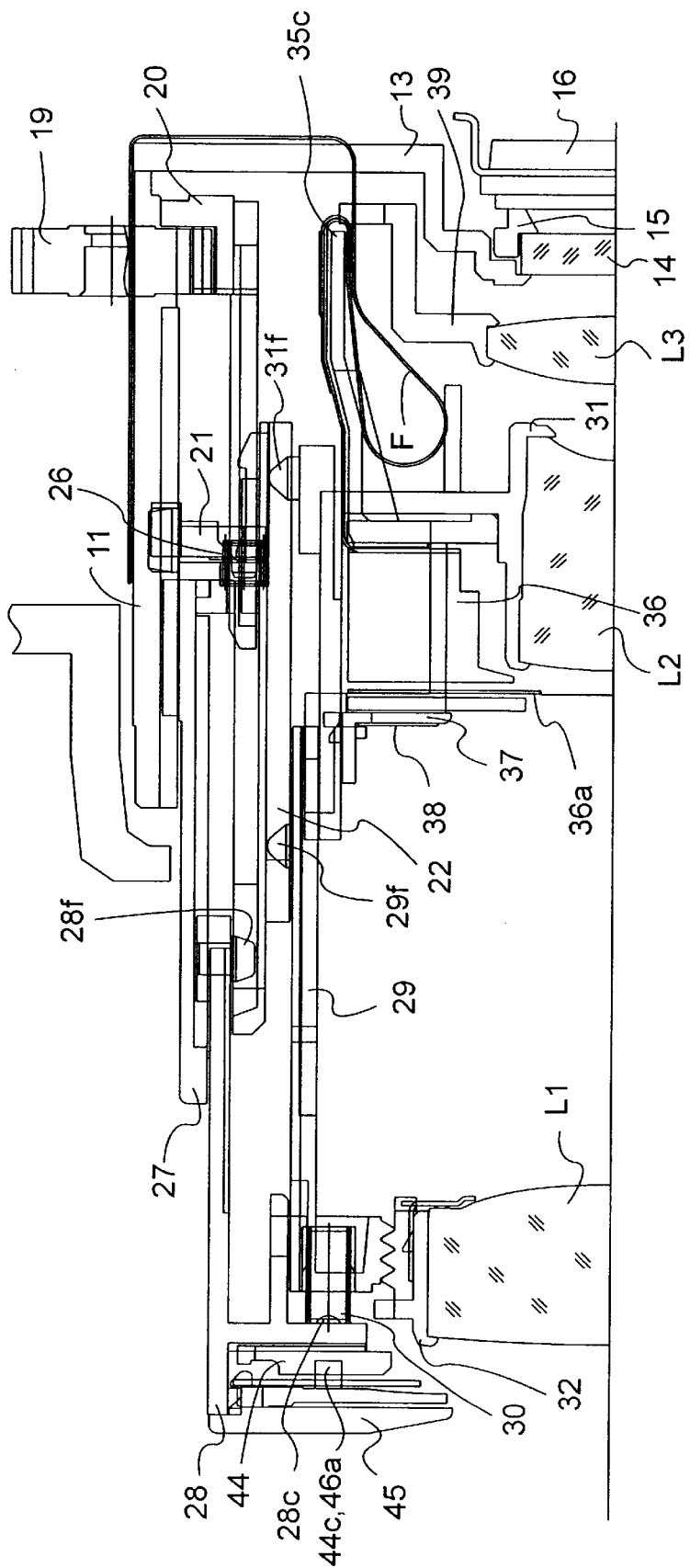
FIG. 9 is a view similar to that of FIG. 8, showing the zoom lens barrel in a wide-angle position.
Figure 10:
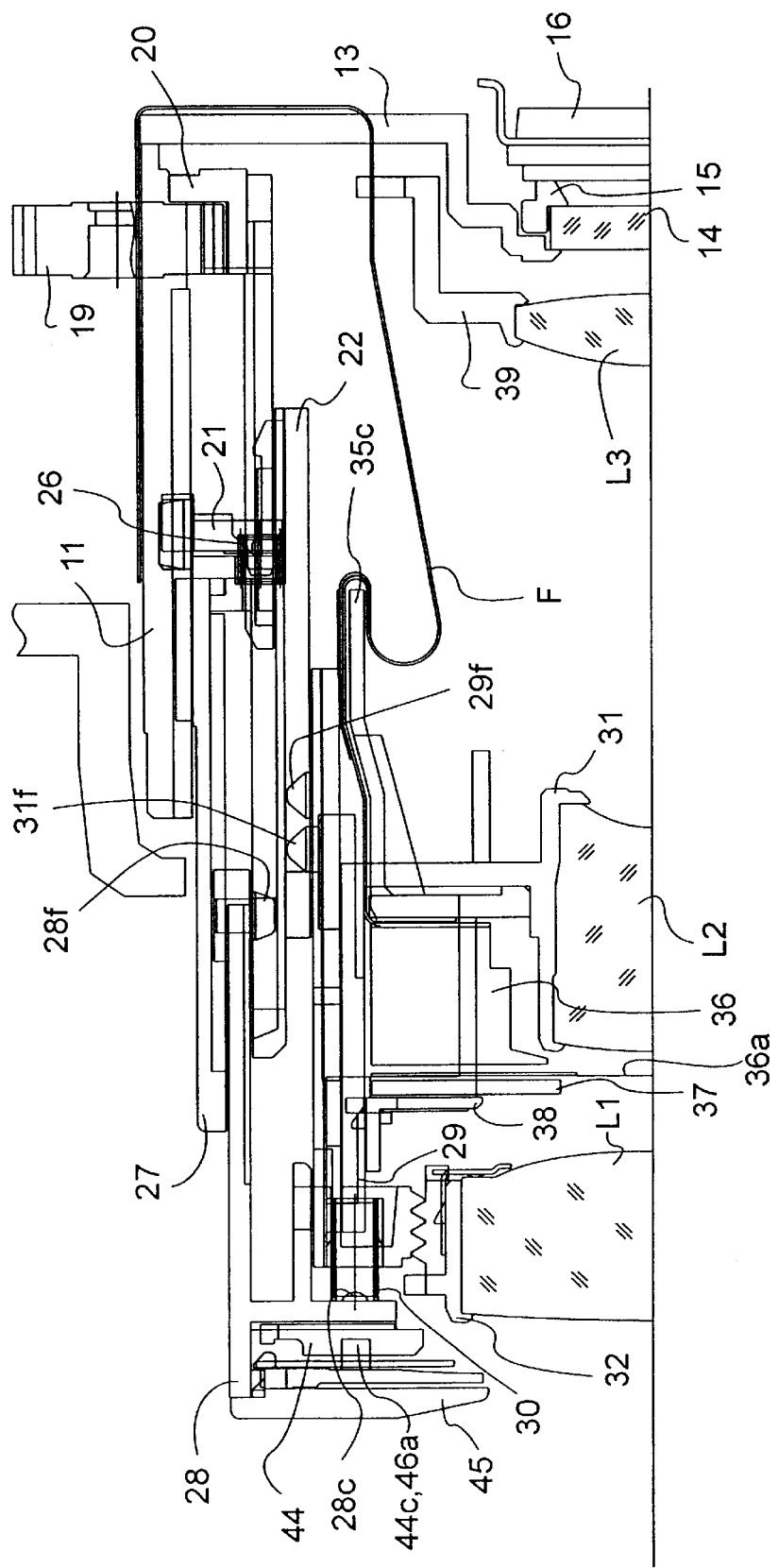
FIG. 10 is a view similar to that of FIG. 8, showing the zoom lens barrel in a telephoto position.

As can be clearly seen in FIGS. 8 through 10, the zoom lens barrel 10 is provided with a photographing optical system constructed of three lens groups: a first lens group (front lens group) L1, a second lens group (rear lens group) L2, and a third lens group L3, in that order from the object side (the left side as viewed in FIGS. 8 through 10). The first and second lens groups L1 and L2 are driven to move along an optical axis O relative to the third lens group L3 while varying the distance therebetween to perform a zooming operation. The third lens group L3 serves as a focusing lens group, and is driven to move along the optical axis O to perform a focusing operation.

Figure 3:
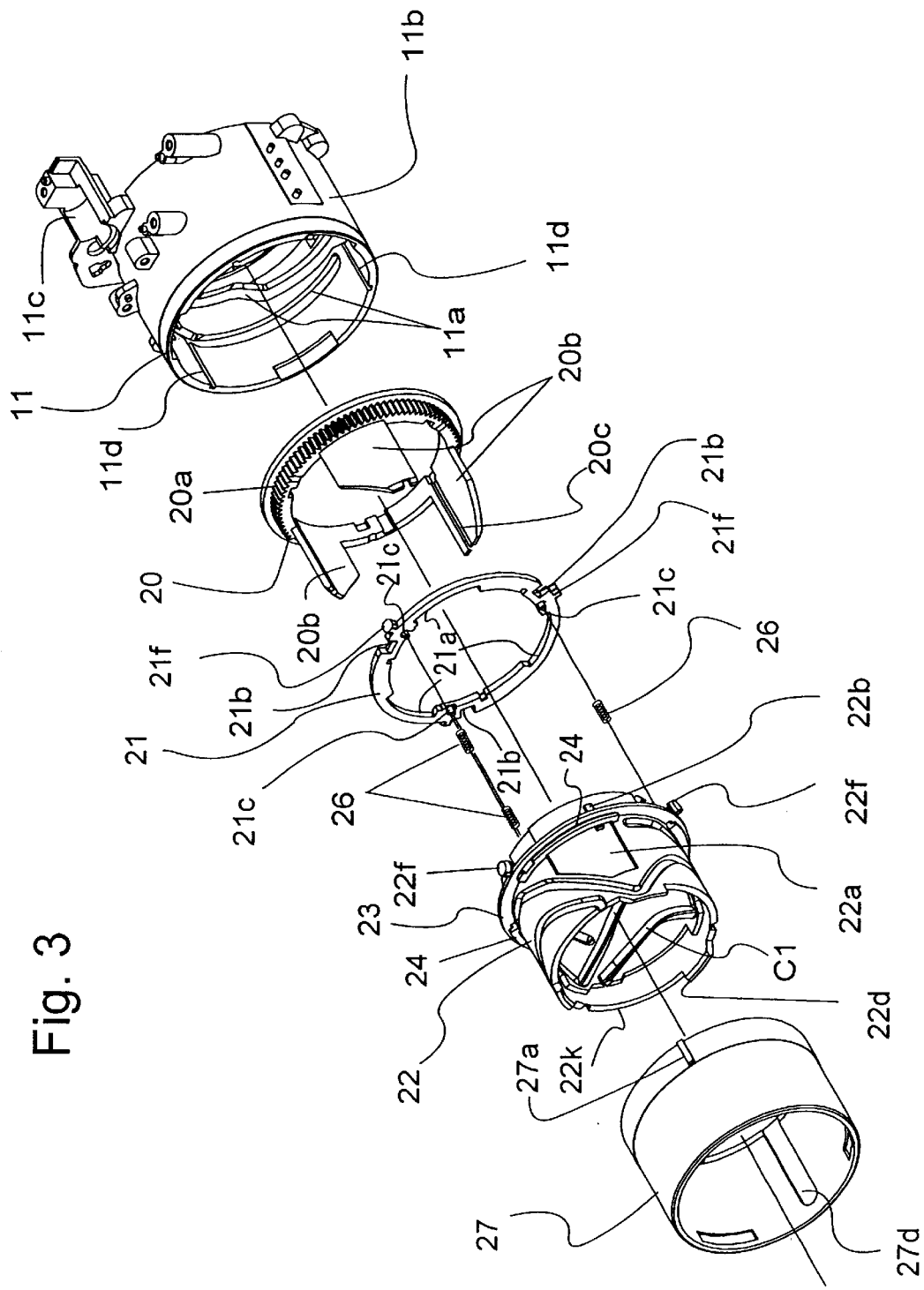
FIG. 3 is an exploded perspective view of another portion of the zoom lens barrel shown in FIG. 1.

As shown in FIG. 1, the zoom lens barrel 10 is provided with a stationary barrel 11, a shaft holding member 12, a CCD holding frame 13, a low-pass filter 14, a rectangular sealing member 15, a CCD 16 and a CCD pressure plate 17, which are all stationary members fixed to a camera body (not shown). Namely, none of these elements either move along an optical axis O (see FIGS. 8, 9 and 10) nor rotate about the optical axis O. The stationary barrel 11 is fixed to the camera body by set screws. As shown in FIGS. 1 and 3, the stationary barrel 11 is provided with an outer cylindrical portion 11b and a gutter-shaped gear holding portion 11c. Three cam grooves 11a are formed on an inner peripheral surface of the outer cylindrical portion 11b at equi-angular intervals (intervals of 120 degrees) in a circumferential direction of the stationary barrel 11. The outer cylindrical portion 11b is further provided on the inner peripheral surface thereof with three linear guide grooves 11d extending parallel to the optical axis O. Three linear guide keys 27a formed on a second ring (outer ring) 27 are respectively engaged in the three linear guide grooves 11d. The zoom lens barrel 10 is provided with a vertical motor 18 having a rotating shaft extending in a vertical direction of the camera (the vertical direction as viewed in FIG. 1). A drive gear 19a of a reduction gear train 19 engaged with the rotating shaft of the vertical motor 18 is mounted on the gear holding portion 11c to partly project into the inside of the stationary barrel 11 through a through hole (not shown) on an upper surface of the stationary barrel 11.

The low-pass filter 14, the sealing member 15 and the CCD 16 are fixed to the rear face of the CCD holding frame 13 with the CCD pressure plate 17.

The zoom lens barrel 10 is provided with a rotational ring 20 on which a circumferential gear portion 20a meshing with the drive gear 19a is formed. The rotational ring 20 is positioned in the rear of the stationary barrel 11 to be freely rotatable about the optical axis O without moving in the direction of the optical axis O (i.e., in the optical axis direction) with respect to the stationary barrel 11. Three rotation-transmission arms 20b project forwards from the rotational ring 20 at equi-angular intervals (intervals of 120 degrees) in a circumferential direction of the rotational ring 20. Each of the three rotation-transmission arms 20b is provided on an inner surface thereof with a rotation-transmission groove 20c extending parallel to the optical axis O.

Figure 14:
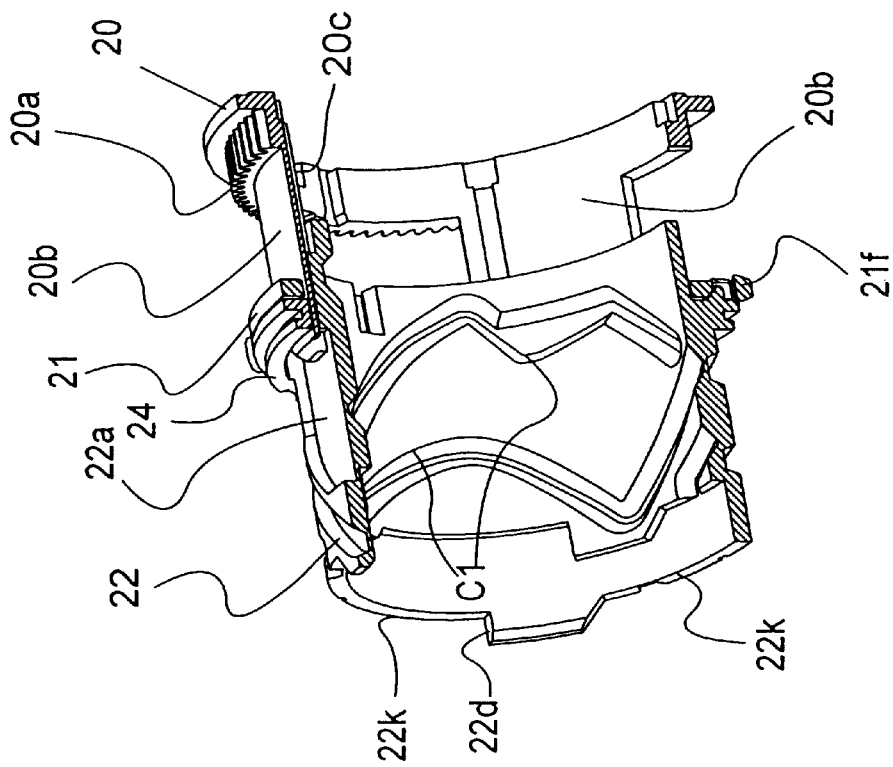
FIG. 14 is a cross sectional view of the cam ring, the rotational ring and the biasing ring.
Figure 15:
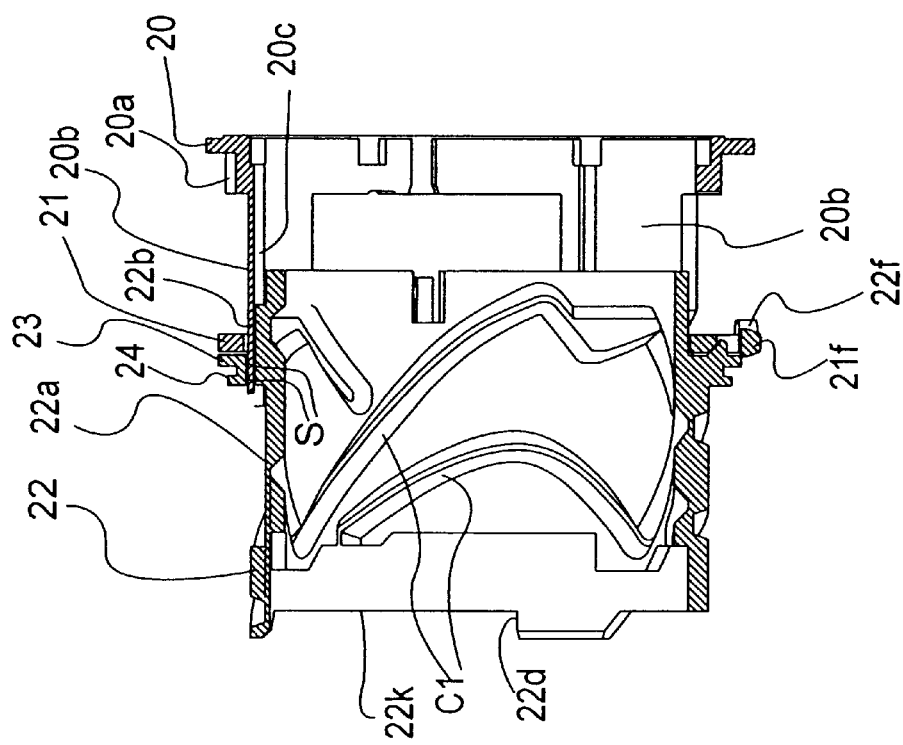
FIG. 15 is a perspective cross sectional view of the cam ring, the rotational ring and the biasing ring.

The zoom lens barrel 10 is provided in the stationary barrel 11 with a cam ring 22 positioned in front of the rotational ring 20. As shown in FIG. 11A, the cam ring 22 is provided, on an outer peripheral surface thereof in the rear end of the cam ring 22, with three bottomed engaging recesses 22a shaped to substantially correspond to the three rotation-transmission arms 20b. The rear end of each engaging recess 22a is formed as an open end. The radial depth of each engaging recess 22a is substantially the same as the radial thickness of each rotation-transmission arm 20b. The cam ring 22 is provided in the vicinity of the rear end thereof with an annular wall (outer flange) 23 projecting radially outwards from the cam ring 22. The cam ring 22 is provided on a front surface of the annular wall 23 with three bayonet prongs 24 each being elongated in a circumferential direction of the cam ring 22 and having an L-shaped cross section. The cam ring 22 is provided, between an inner surface of the annular wall 23 and the three engaging recesses 22a and between the three bayonet prongs 24 and the set of engaging recesses 22a, with three slots S (see FIG. 14) extending in the optical axis direction so that the three rotation-transmission arms 20b are held between radial-bottom surfaces of the three engaging recesses 22a and the respective inner surfaces of the annular wall 23 in the three slots S to be movable in the optical axis direction with respect to the cam ring 22, respectively. The cam ring 22 is provided in the three engaging recesses 22a with three guide keys 22b which extend in the optical axis direction to be slidably engaged with the three rotation-transmission grooves 20c, respectively. The cam ring 22 is provided, on an outer peripheral surface thereof at equi-angular intervals (intervals of 120 degrees) in a circumferential direction of the cam ring 22, with three follower pins 22f which extend radially outwards to be engaged in the three cam grooves 11a of the stationary barrel 11, respectively.

The three rotation-transmission arms 20b of the rotational ring 20 are slidably engaged in the three engaging recesses 22a to be freely movable in the optical axis direction with respect to the cam ring 22 with the three guide keys 22b being engaged in the three rotation-transmission grooves 20c, respectively. The three rotation-transmission arms 20b are respectively prevented from coming off the three engaging recesses 22a radially outwards by the annular wall 23, which is positioned radially outside the three engaging recesses 22a.

As shown in FIG. 3, the zoom lens barrel 10 is provided with a biasing ring 21 which is fitted on the rear end of the cam ring 22 to be positioned behind the annular wall 23. The biasing ring 21 is provided on an inner peripheral surface thereof with three recesses 21a in which the three rotation-transmission arms 20b are respectively inserted to be freely slidable in the optical axis direction. The biasing ring 21 is provided, on an outer peripheral surface thereof at equi-angular intervals (intervals of 120 degrees) in a circumferential direction of the biasing ring 21, with three recesses 21b. The biasing ring 21 is further provided, on an outer peripheral surface thereof at equi-angular intervals (intervals of 120 degrees) in a circumferential direction of the biasing ring 21, with three follower pins 21f in the close vicinity of the three recesses 21b, respectively. The three follower pins 22f of the cam ring 22 are engaged in the three recesses 21b.

The biasing ring 21 is provided, on a front surface thereof at equi-angular intervals (intervals of 120 degrees) in a circumferential direction of the biasing ring 21, with three spring-support projections 21c, and the cam ring 22 is provided in the rear thereof with three spring-support recesses (not shown) formed to correspond to the three spring-support projections 21c. One end of each of the three compression helical springs 26 are inserted into the three spring-support recesses while the other ends thereof are fitted on the three spring-support projections 21c so that the three compression helical springs 26 are held under compression between the three spring-support recesses and the biasing ring 21. Accordingly, the cam ring 22 is always biased toward the front of the optical axis direction, while the biasing ring 21 is biased toward the rear of the optical axis direction. Namely, the cam ring 22 and the biasing ring 21 are biased in opposite directions away from each other along the optical axis O by the three compression helical springs 26.

Figure 28:
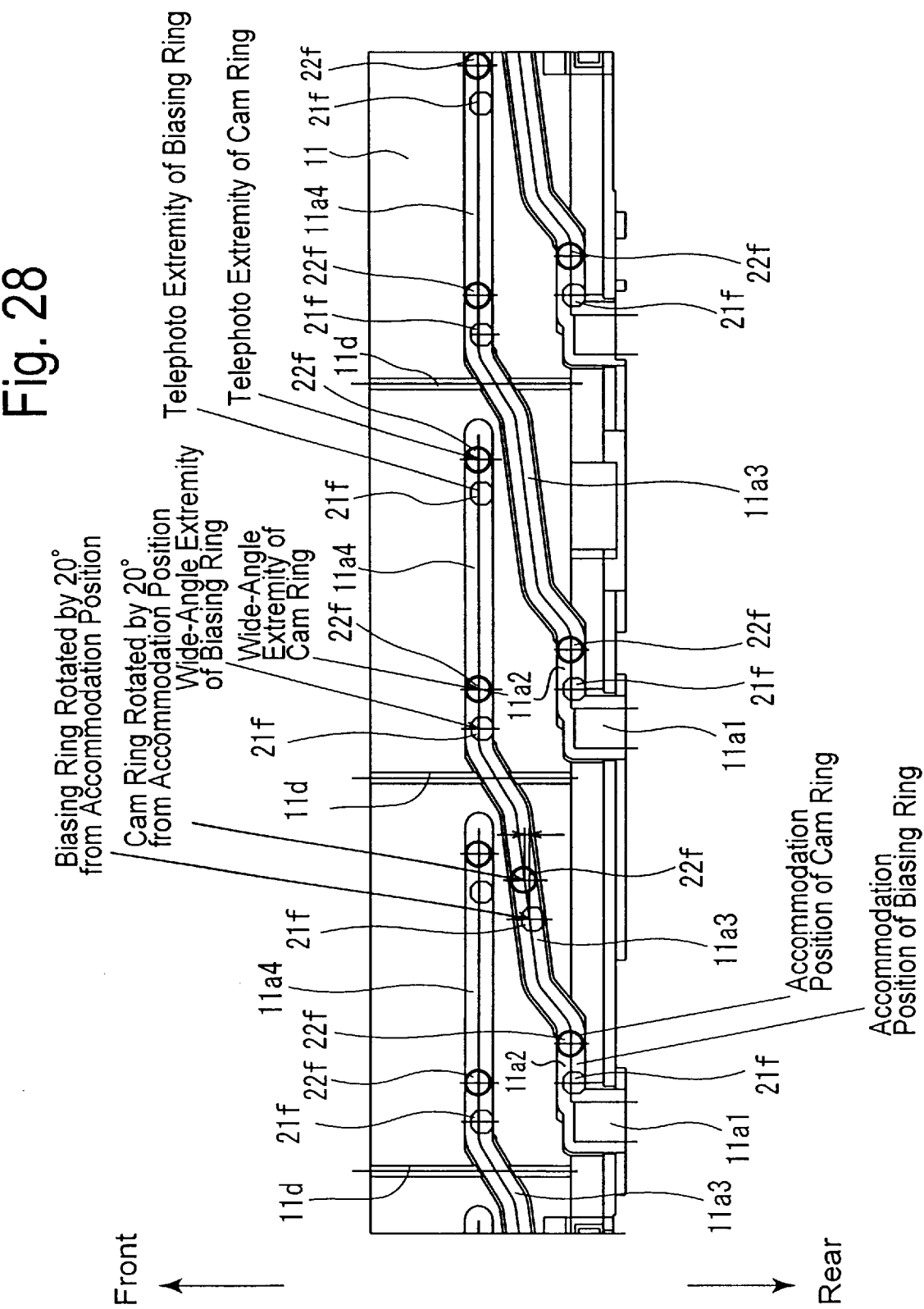
FIG. 28 is a developed view of an inner peripheral surface of a stationary barrel shown in FIG. 1.

As shown in FIG. 28, the three follower pins 21f of the biasing ring 21 and the three follower pins 22f of the cam ring 22 are engaged in the three cam grooves 11a of the stationary barrel 11 at different circumferential positions, respectively. Each cam groove 11a includes a linear groove portion 11a1, an accommodation groove portion 11a2, a position-changing groove portion 11a3 and a zooming groove portion 11a4. The linear groove portion 11a1 extends in the optical axis direction. The accommodation groove portion 11a2 extends in a circumferential direction of the cam ring 22. The position-changing groove portion 11a3 extends in a direction inclined with respect to both the optical axis O and a circumferential direction of the cam ring 22. The zooming groove portion 11a4 extends in a circumferential direction of the cam ring 22, i.e., extends parallel to the accommodation groove portion 11a2. The three follower pins 21f and the three follower pins 22f are inserted into the three cam grooves 11a via the linear groove portions 11a1 thereof, respectively.

In a state where the follower pins 21f and the follower pins 22f are respectively engaged in the accommodation groove portions 11a2 (i.e., in a state where the cam ring 22 is in an accommodation position/fully-retracted position), a forward rotation of the motor 18 causes the rotational ring 20 to rotate in a direction to extend the zoom lens barrel 10 relative to the stationary barrel 11. This causes the rotational ring 20 to transfer the rotational motion thereof to the cam ring 22 due to the engagement of the three guide keys 22b of the cam ring 22 in the three rotation-transmission grooves 20c of the rotational ring 20, respectively, so that the rotational ring 20, the biasing ring 21 and the cam ring 22 rotate together about the optical axis O. Further forward rotation of the motor 18 causes each follower pin 21f of the biasing ring 21 and each follower pin 22f of the cam ring 22 to move from the accommodation groove portion 11a2 to the position-changing groove portion 11a3, so that the cam ring 22 moves forward in the optical axis direction while rotating about the optical axis O. Further forward rotation of the motor 18 causes each follower pin 21f and each follower pin 22f to move from the position-changing groove portion 11a3 to the zooming groove portion 11a4, so that the cam ring 22 rotates about the optical axis O without further moving in the optical axis direction in accordance with the cam profile of the zooming groove portion 11a4.

Figure 13:
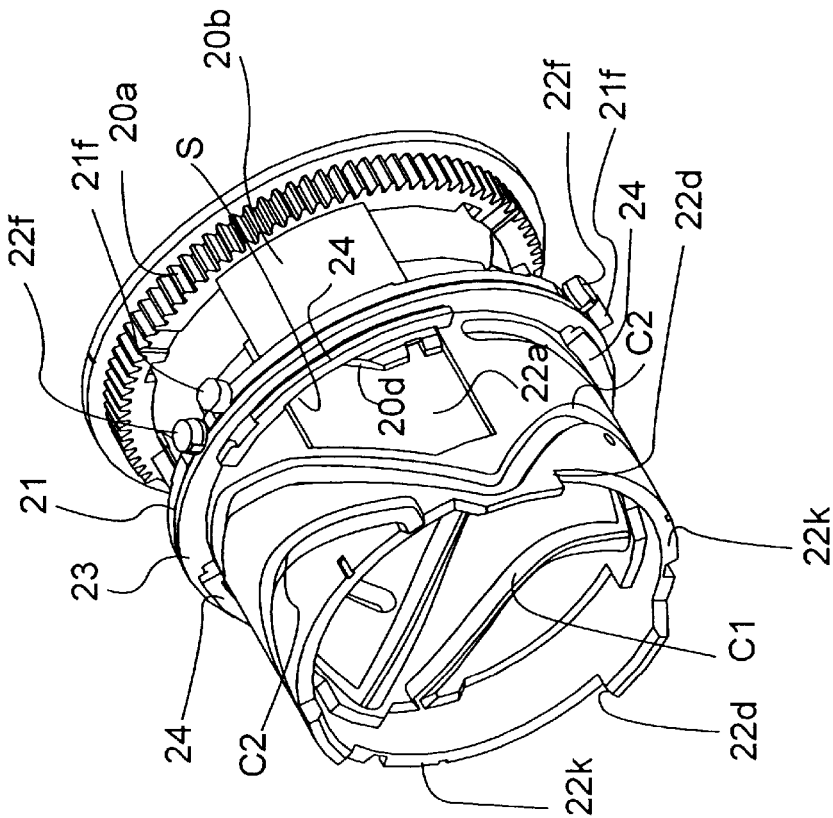
FIG. 13 is a view similar to that of FIG. 12, showing the cam ring, rotational ring and the biasing ring in a photographing position.
Figure 12:
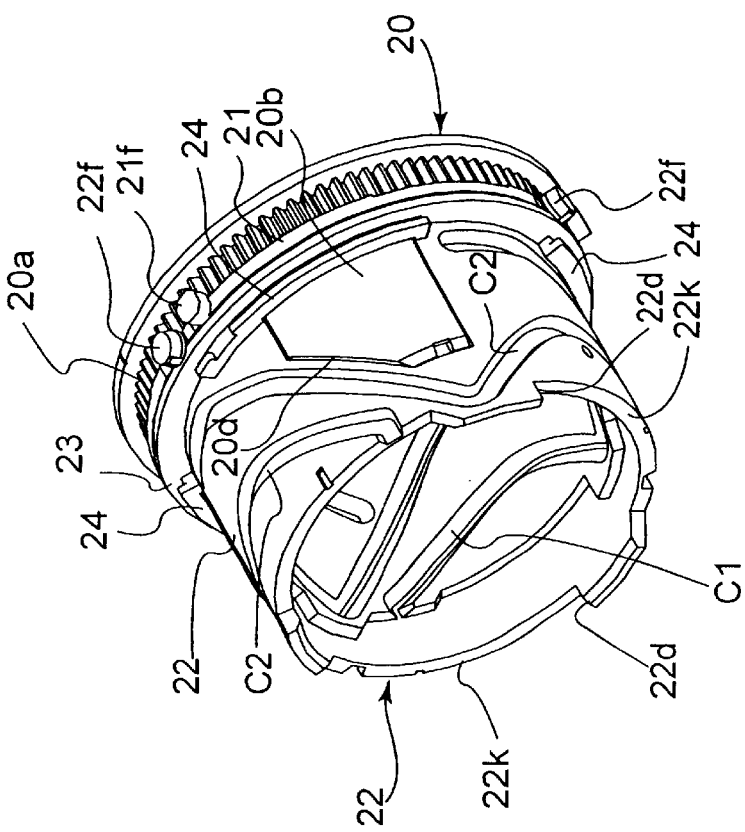
FIG. 12 is a perspective view of the cam ring, the rotational ring and a biasing ring fitted on the rear end of the cam ring in the accommodation position shown in FIG. 8.

As shown in FIG. 12, in a state where both the follower pins 21f and the follower pins 22f are engaged in the accommodation groove portions 11a2 (i.e., in a state where the cam ring 22 is in the accommodation position), the three rotation-transmission arms 20b are fully fitted (accommodated) in the three engaging recesses 22a with the front end surface of the circumferential gear portion 20a of the rotational ring 20 being in contact with the rear end surface of the biasing ring 21. In this state, the movement of the follower pins 21f and the follower pins 22f to the zooming groove portion 11a4 via the position-changing groove portion 11a3 causes the cam ring 22 and the biasing ring 21 to move together forwards to enter a photographing position as shown in FIG. 13, with the rotational ring 20 remaining in the rear of the stationary barrel 11.

Thereafter, a reverse rotation of the motor 18 causes the follower pins 21f and the follower pins 22f to move from the zooming groove portion 11a4 toward the accommodation groove portions 11a2, performing a movement reverse to the above-described movement. At the same time, the rotational ring 20, the biasing ring 21 and the cam ring 22 move from the photographing state shown in FIG. 13 to the accommodation position shown in FIG. 12.

In the present embodiment of the zoom lens barrel, the rotational ring 20, the biasing ring 21, the cam ring 22 and a barrier drive ring 44 are rotatable elements. The remaining movable elements, except for a second lens group moving frame (rear lens frame) 31, linearly move in the optical axis direction without rotating about the optical axis O. The second lens group moving frame 31 can slightly rotate about the optical axis O. Such linearly moving elements and linear guiding mechanisms thereof will be hereinafter discussed.

As shown in FIG. 8, the zoom lens barrel 10 is provided between the stationary barrel 11 and the cam ring 22 with the second ring 27 and a first ring (inner ring) 28 positioned in the second ring 27. The second ring 27, which is positioned just inside the stationary barrel 11, is provided, on an inner peripheral surface thereof at the rear end of the second ring 27, with three bayonet prongs 27c (only of which appears in FIG. 8) which are engaged with the three bayonet prongs 24 of the cam ring 22, respectively. Due to the engagement of the three bayonet prongs 27c with the three bayonet prongs 24, the second ring 27 is relatively rotatable about the optical axis O with respect to the cam ring 22, and does not relatively move in the optical axis direction with respect to the cam ring 22.

As shown in FIG. 1, the second ring 27 is provided, on an outer peripheral surface thereof at the rear end of the second ring 27, with the three linear guide keys 27a. The three linear guide keys 27a are formed on the second ring 27 at equi-angular intervals (intervals of 120 degrees) in a circumferential direction of the second ring 27 to be respectively engaged in the three linear guide grooves 11d. The second ring 27 is guided linearly in the optical axis direction without rotating about the optical axis O with respect to the stationary barrel 11 due to the engagement of the three linear guide keys 27a with the three linear guide grooves 11d.

The second ring 27 is provided, on an inner peripheral surface thereof at equi-angular intervals (intervals of 120 degrees) in a circumferential direction of the second ring 27, with three linear guide grooves 27b which extend parallel to the optical axis O. The first ring 28 is provided, on an outer peripheral surface thereof, at the rear end of the first ring 28 at equi-angular intervals (intervals of 120 degrees) in a circumferential direction of the first ring 28, with three cylindrical projections 28a which are engaged in the three linear guide grooves 27b, respectively. The first ring 28 is guided linearly in the optical axis direction without rotating about the optical axis O with respect to the second ring 27 due to the engagement of the three linear guide grooves 27b with the three cylindrical projections 28a. Each of the three cylindrical projections 28a is provided with a radial hole 28a into which a follower pin 28f (see FIGS. 8 through 10) is press-fitted.

The first ring 28 is provided in the vicinity of the front end thereof with an inner flange 28b which extends radially inwards and to which a barrier unit 43 and the barrier drive ring 44 are fixed. The first ring 28 is provided therein, on a rear surface of the inner flange 28b, with three guiding members 28e (only one of them is indicated in FIGS. 1 and 8) which extend in the optical axis direction. The zoom lens barrel 10 is provided with a first lens group moving frame (front lens frame) 29 which holds the first lens group L1 via a first lens group supporting frame 32. The first lens group moving frame 29 is positioned in the first ring 28 to be surrounded and supported by the three guiding members 28e to be slidably guided thereby in the optical axis direction. Specifically, the first lens group moving frame 29 is provided, on an outer peripheral surface thereof at the front end of the first lens group moving frame 29 at equi-angular intervals in a circumferential direction of the first lens group moving frame 29, with three linear guide grooves 29a which extend parallel to the optical axis O, and three linear guide keys 28d which are formed on inner surfaces of the three guiding members 28e to extend parallel to the optical axis O are slidably engaged in the three linear guide grooves 29a, respectively, so that the first lens group moving frame 29 is guided linearly in the optical axis direction without rotating about the optical axis O by the first ring 28.

Figure 24:
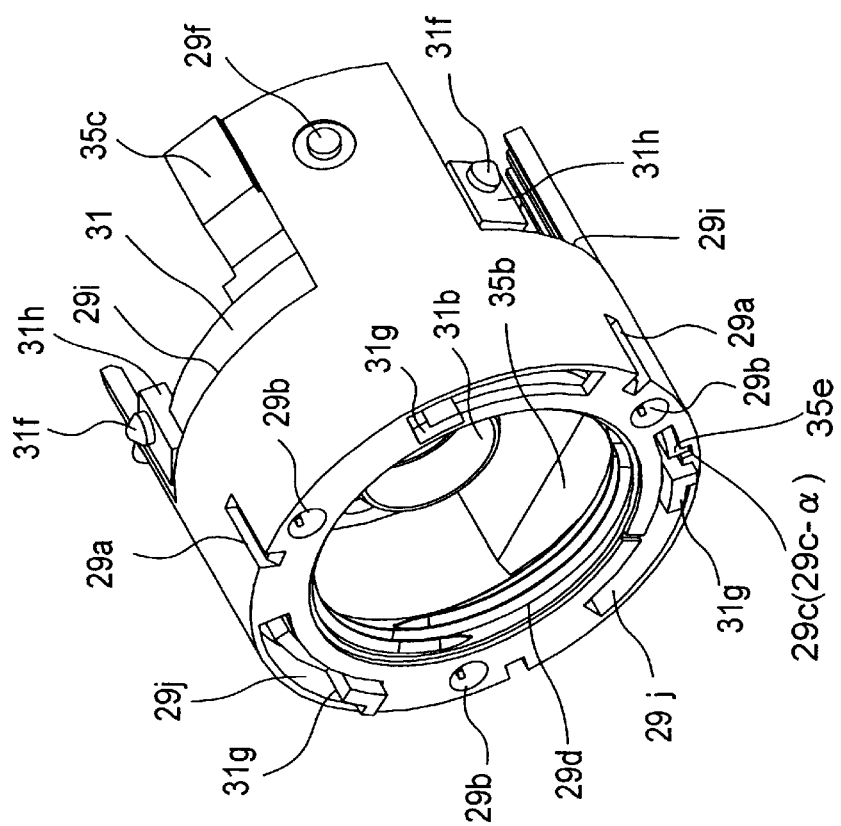
FIG. 24 is a perspective view of the first lens group moving frame and the second lens group moving frame fitted in the first lens group moving frame in the accommodation position shown in FIG. 8.
Figure 25:
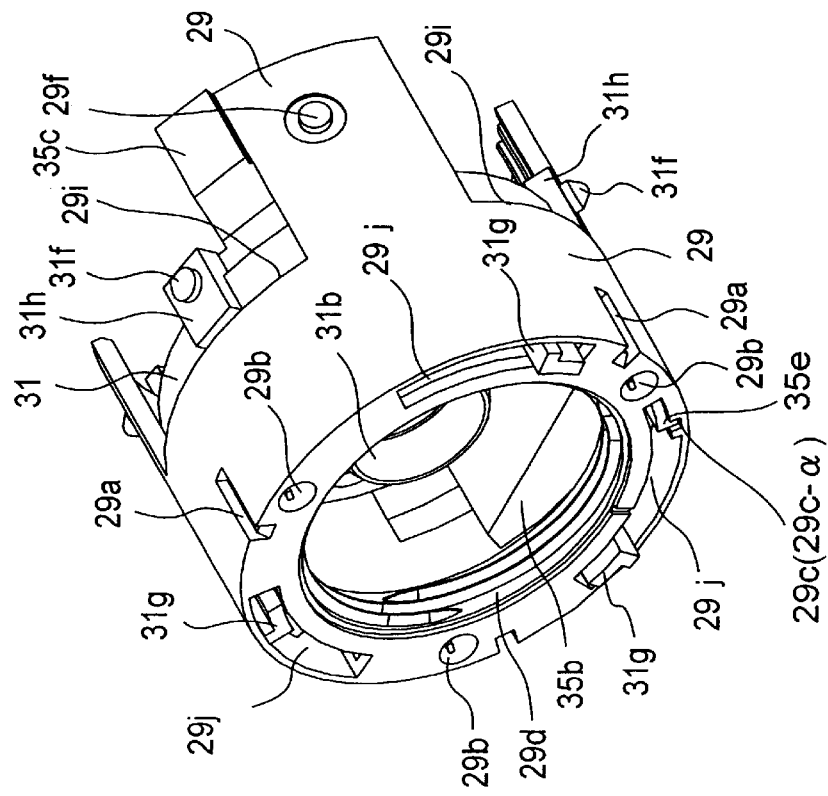
FIG. 25 is a view similar to that of FIG. 24, showing a state where three linear guide keys of the second lens group moving frame and corresponding three linear guide grooves of four linear guide grooves of the first lens group moving frame are aligned in the optical axis direction of the zoom lens barrel so that the three linear guide keys can be engaged in the corresponding three linear guide keys, respectively.
Figure 26:
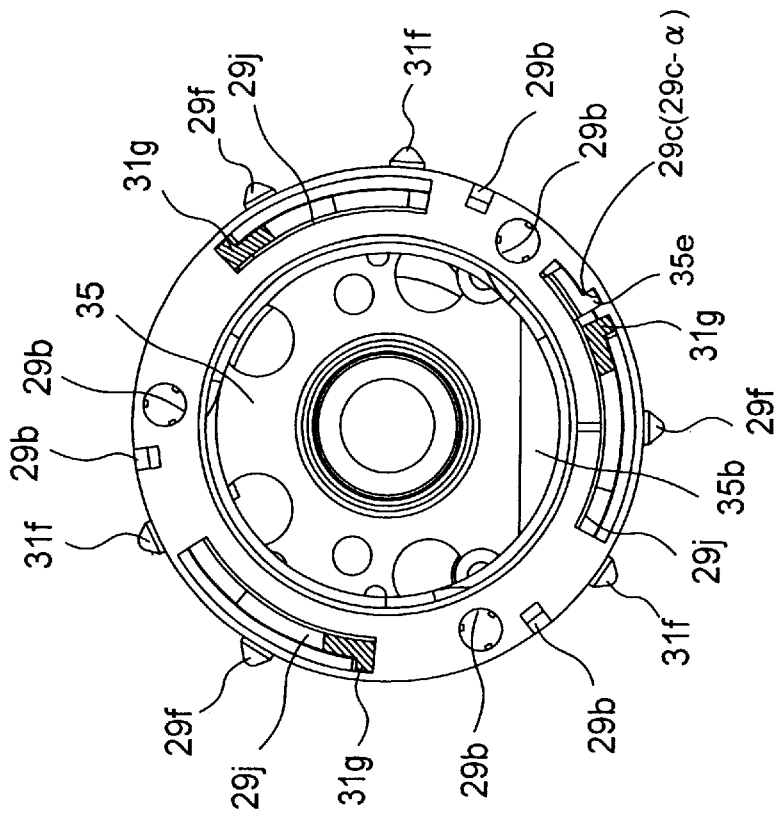
FIG. 26 is a front elevational view of the first lens group moving frame and the second lens group moving frame fitted in the first lens group moving frame in the accommodation position shown in FIG. 8.
Figure 27:
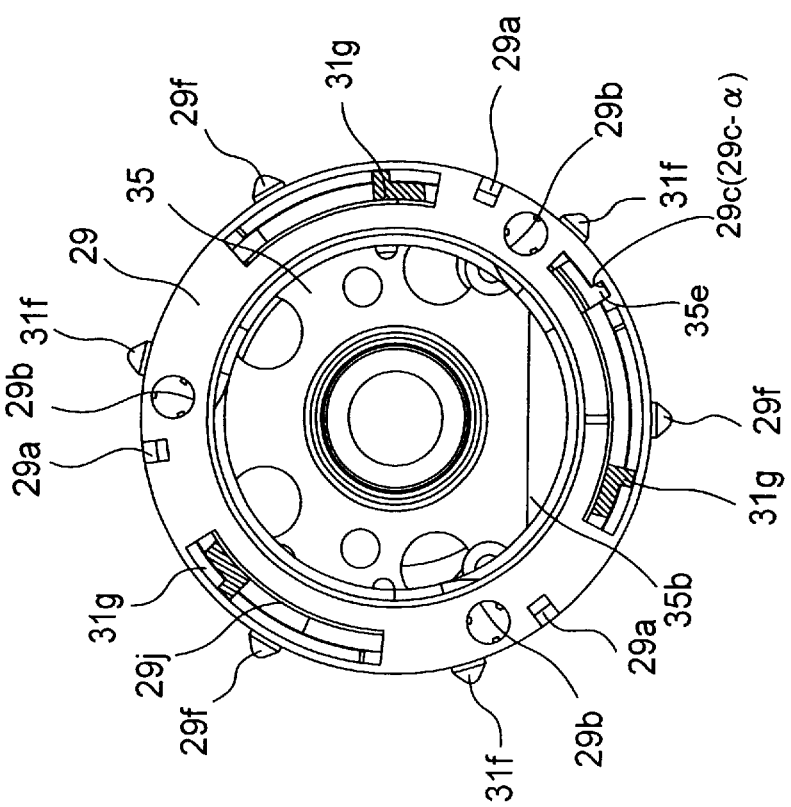
FIG. 27 is a view similar to that of FIG. 26, showing a state where the three linear guide keys of the second lens group moving frame and the corresponding three linear guide grooves of the four linear guide grooves of the first lens group moving frame are aligned in the optical axis direction of the zoom lens barrel so that the three linear guide keys can be engaged in the corresponding three linear guide keys, respectively.

The inner flange 28b of the first ring 28 is provided on a rear face thereof, at equi-angular intervals (intervals of 120 degrees) in a circumferential direction of the first ring 28, with three spring-support protrusions 28c (see FIGS. 8 through 10), and the first lens group moving frame 29 is provided, on a front end surface thereof at positions thereon facing the set of spring support protrusions 28c, with three spring-support recesses 29b which are formed at equi-angular intervals in a circumferential direction of the first lens group moving frame 29. Three helical compression springs 30 serving as a biasing device are inserted to be held between the three spring-support projections 28c and the three spring-support recesses 29b, respectively, to press the first lens group moving frame 29 rearwards in the optical axis direction. The first lens group moving frame 29 is provided at the rear end thereof with three cutout portions 29i in which three engaging projections 31h formed on an outer peripheral surface of the second lens group moving frame 31 at the rear end thereof are positioned, respectively (see FIG. 24).

The second lens group moving frame 31 that supports the second lens group L2 is fitted in the first lens group moving frame 29. The second lens group moving frame 31 is provided, on an outer peripheral surface thereof at the front end of the outer peripheral surface, with three linear guide keys (second linear guide projection) 31a (see FIGS. 1 and 2) which are slidably engaged in three linear guide grooves of four linear guide grooves 29c (only one of them appears in each of FIGS. 21A through 21J) which are formed on an inner peripheral surface of the first lens group moving frame 29 to extend parallel to the optical axis O. Due to the engagement of the three linear guide keys 31a with the three linear guide grooves 29c, the second lens group moving frame 31 is guided linearly without rotating about the optical axis O by the first lens group moving frame 29.

As can be understood from the above description, according to the above described linear guiding mechanisms, the second ring 27 is guided linearly in the optical axis direction without rotating about the optical axis O via the stationary barrel 11, the first ring 28 is guided linearly in the optical axis direction without rotating about the optical axis O via the second ring 27, the first lens group moving frame 29 is guided linearly in the optical axis direction without rotating about the optical axis O via the first ring 28, and the second lens group moving frame 31 is guided linearly in the optical axis direction without rotating about the optical axis O via the first lens group moving frame 29, in that order from the outside to the inside of the zoom lens barrel 10.

The first lens group moving frame 29 is provided at the front end thereof with an inner flange 29g which extends radially inwards to form a circular aperture having the center thereof about the optical axis O. As shown in FIG. 1, a female thread portion 29d is formed on an inner peripheral face of the inner flange 29g. A lens pressure ring 32a is fixed to the rear end surface of the first lens group supporting frame 32 that holds the first lens group L1. The first lens group supporting frame 32 is provided on an outer peripheral surface thereof with a male thread portion which is in mesh with the female thread portion 29d of the inner flange 29g. The first lens group supporting frame 32 is cemented to the first lens group moving frame 29 by adhesive after the thread engagement position of the male thread portion of the first lens group supporting frame 32 with respect to the female thread portion 29d of the inner flange 29g has been adjusted during assembly.

Figure 2:
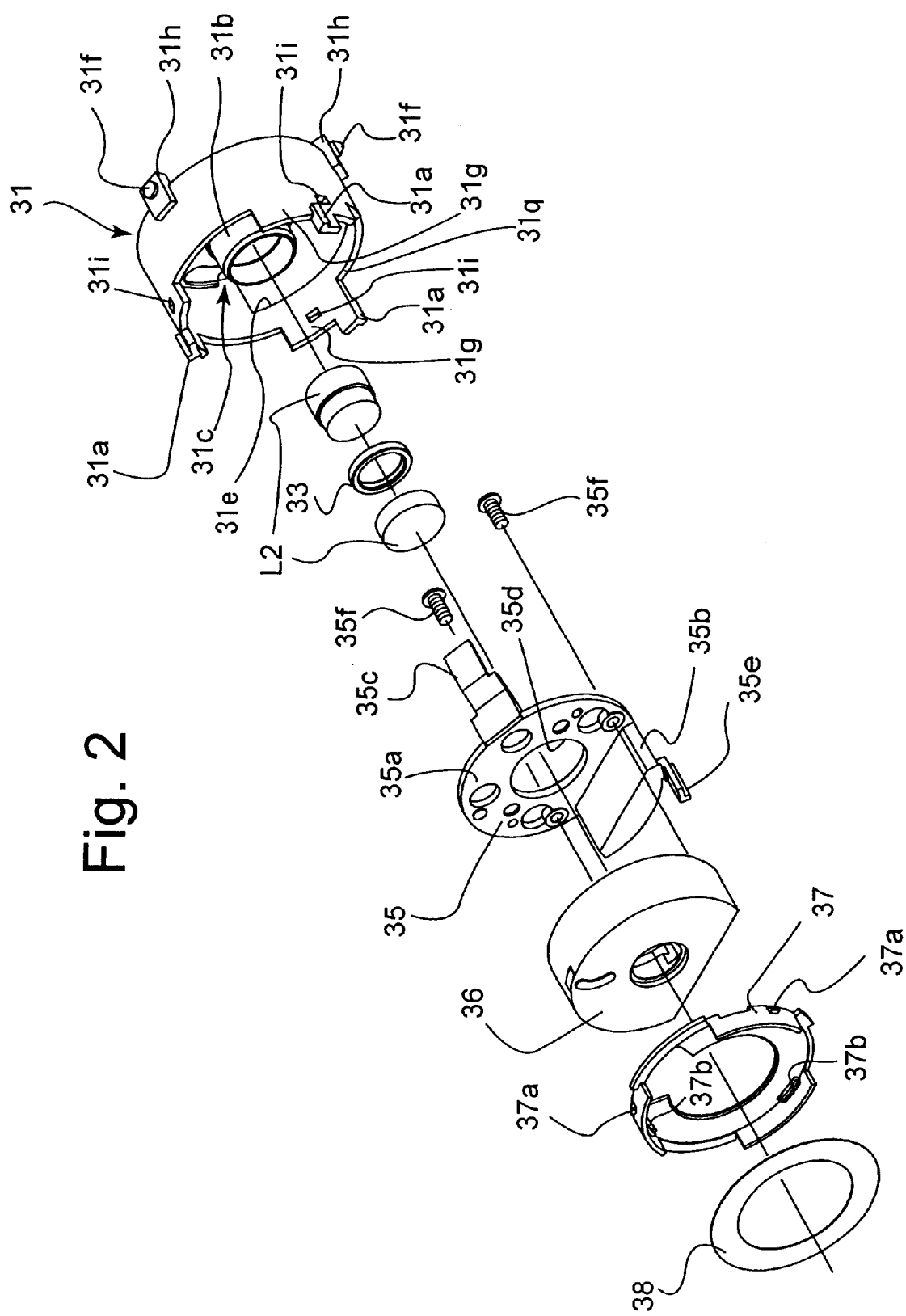
FIG. 2 is an exploded perspective view of a portion of the zoom lens barrel shown in FIG. 1.
Figure 5:
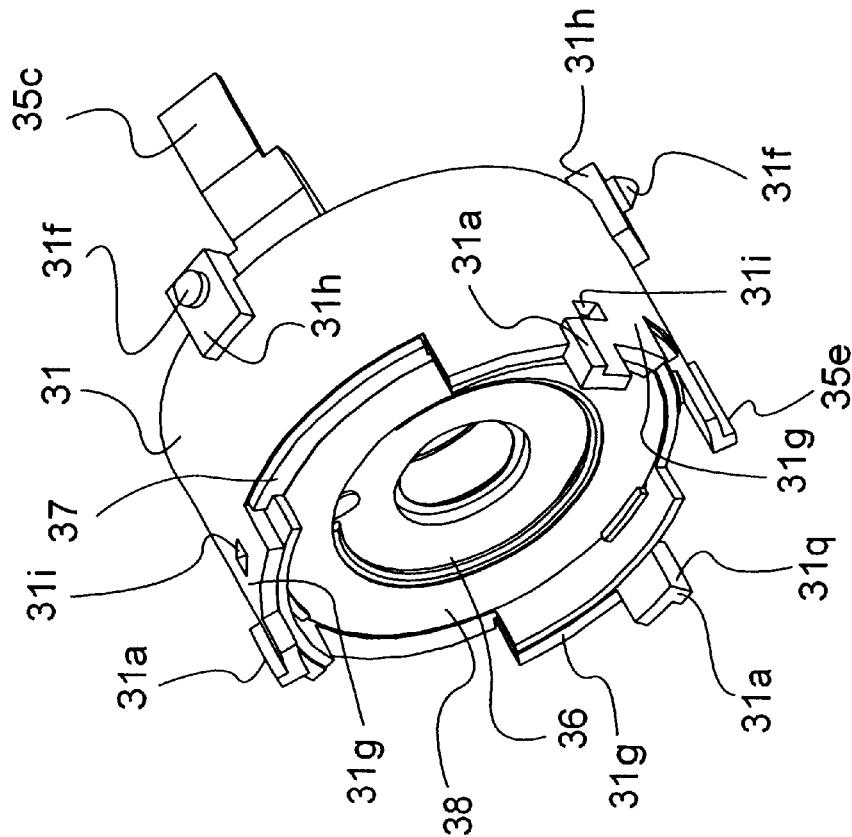
FIG. 5 is a perspective view of the second lens group moving frame and the shutter unit fixed to the second lens group moving frame, which are shown in FIG. 1, as viewed obliquely from rear of the second lens group moving frame.
Figure 7:
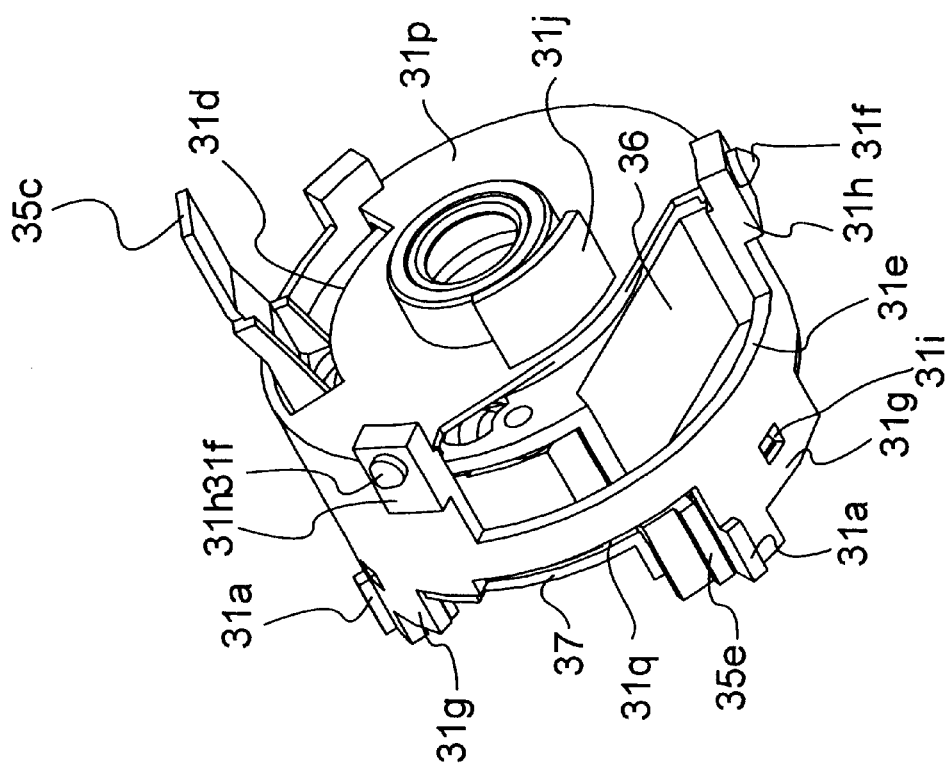
FIG. 7 is a view similar to that of FIG. 5, showing a position where the second lens group moving frame has rotated by a predetermined amount of rotation with respect to the shutter unit from the position shown in FIG. 5.

As shown in FIG. 2, the second lens group moving frame 31 is provided on a rear end wall thereof, at the center of the rear end wall, with a cylindrical portion 31b, the front and rear ends thereof being open. An annular recess 31c is formed between an outer circumferential wall of the second lens group moving frame 31 and the cylindrical portion 31b. As shown in FIGS. 1 and 2, the second lens group L2 consists of two separate lens elements, a spacer ring 33 being positioned therebetween. The two lens elements of the second lens group L2 together with the spacer ring 33 are fitted in the cylindrical portion 31b to be fixed therein. As shown in FIGS. 5 and 7, the second lens group moving frame 31 is provided on the rear end wall thereof with a first cutout portion (through-hole) 31d in the shape of an arc, and is provided, across the outer circumferential wall and the rear end wall of the second lens group moving frame 31, with a second cutout portion 31e which is larger than the first cutout portion 31d.

The zoom lens barrel 10 is provided in the annular recess 31c of the second lens group moving frame 31 with a shutter unit 36. As shown in FIG. 2, a shutter support ring 35, positioned between the shutter unit 36 and the second lens group moving frame 31, is provided on a front surface of a ring portion 35a thereof with a support member 35b which projects forward from the ring portion 35a to support the shutter unit 36. The shutter support ring 35 is provided on a rear surface of the ring portion 35a with a flexible printed wiring board (flexible PWB) fixing member 35c which extends rearward from the ring portion 35a. The shutter support ring 35 is provided at the center of the ring portion 35a with a circular aperture 35d in which the cylindrical portion 31b is fitted. The shutter support ring 35 is loosely fitted in the annular recess 31c to be freely rotatable about the optical axis O with respect to the second lens group moving frame 31 with the cylindrical portion 31b being fitted in the circular aperture 35d and with the flexible PWB fixing member 35c extending through the rear end wall of the second lens group moving frame 31 through the first cutout portion 31d. As shown in FIG. 2, the shutter support ring 35 is provided on the support member 35b with a linear guide key (linear guide projection) 35e extending parallel to the optical axis O. The linear guide key 35e is engaged in one of the four linear guide grooves 29c, in which the linear guide key 31a which is not engaged, to be freely and slidably movable therein in the optical axis direction. Accordingly, the shutter support ring 35 is not rotatable about the optical axis O since the first lens group moving frame 29 is not rotatable about the optical axis O either.

The shutter unit 36 is mounted on the support member 35b, and is fixed to the support member 35b by two set screws 35f as shown in FIG. 2.

Figure 4:
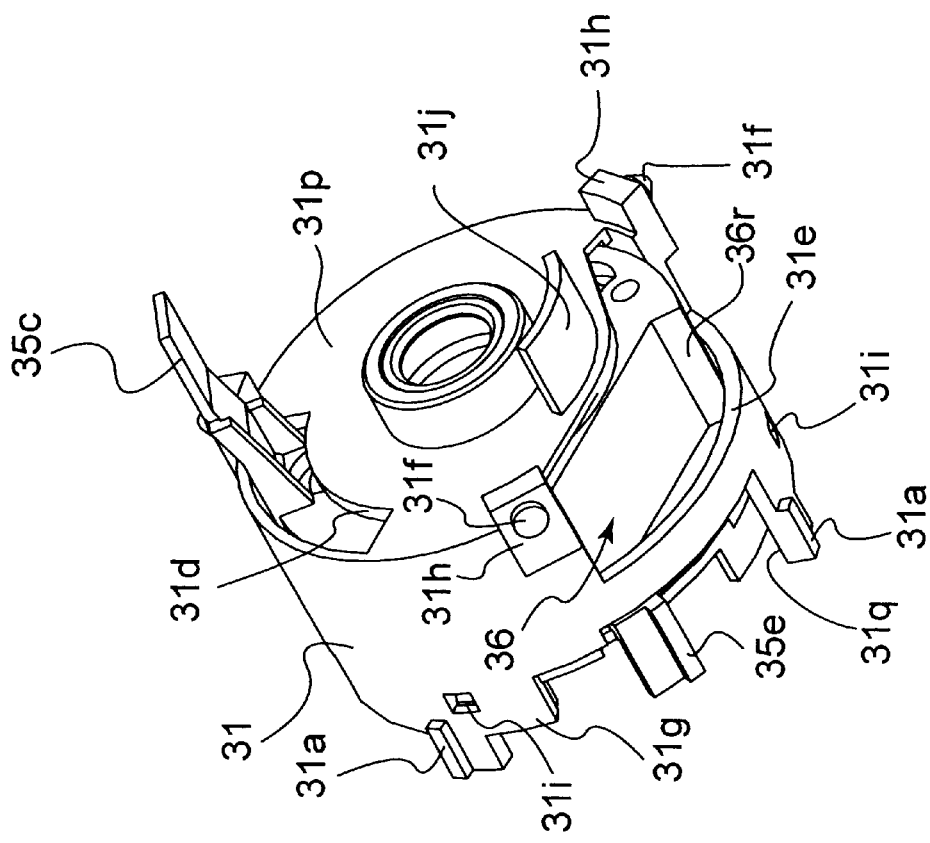
FIG. 4 is a perspective view of a second lens group moving frame and a shutter unit fixed to the second lens group moving frame, which are shown in FIG. 1, as viewed obliquely from front of the second lens group moving frame.
Figure 6:
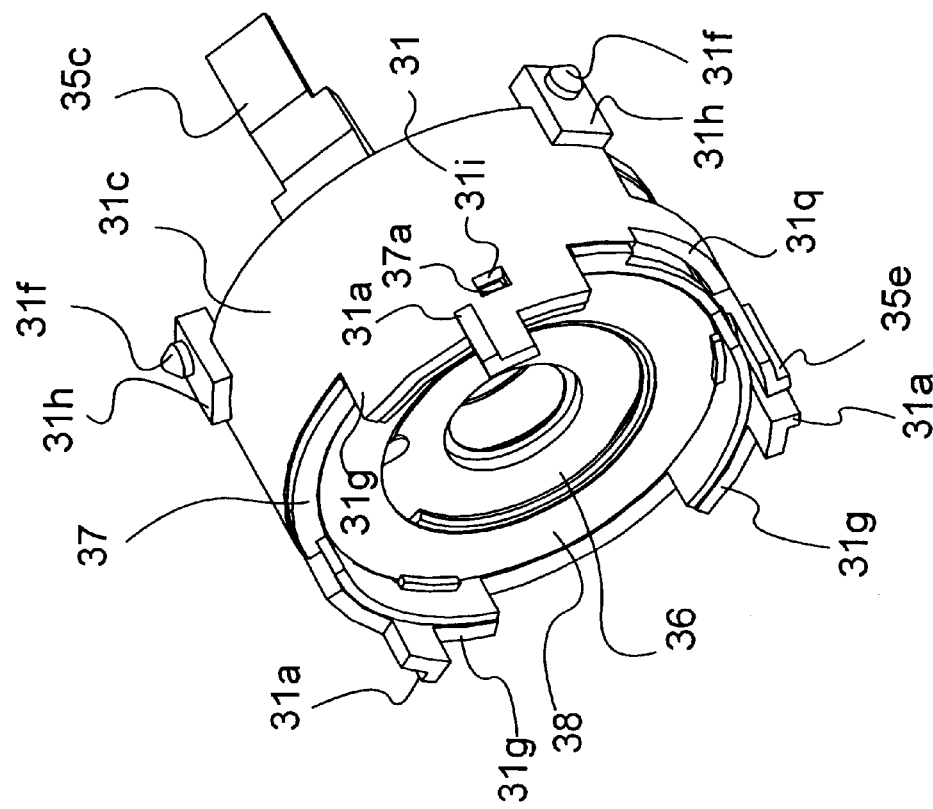
FIG. 6 is a view similar to that of FIG. 4, showing a position where the second lens group moving frame has rotated by a predetermined amount of rotation with respect to the shutter unit from the position shown in FIG. 4.

The second lens group moving frame 31 is provided, on the outer circumferential wall thereof in the vicinity of the front end of the outer circumferential wall, with three engaging holes 31i positioned on a circle about the optical axis O. A shutter pressure plate 37 positioned in front of the shutter unit 36 is provided, on an outer peripheral surface thereof, with three engaging projections 37a which are elastically engaged in the three engaging holes 31i, respectively. The shutter support ring 35 and the shutter unit 36 are prevented from coming off the annular recess 31c by the shutter pressure plate 37 in a manner such that the shutter pressure plate 37 closes the front end of the annular recess 31c with the three engaging projections 37a being engaged in the three engaging holes 31i (see FIGS. 4 and 6).

The shutter pressure plate 37 is provided on a front surface thereof with three engaging protrusions 37b. A low-frictional ring sheet 38 is fixed to a front annular surface of the shutter pressure plate 37 to be held between the three engaging protrusions 37b and the front annular surface of the shutter pressure plate 37. The low-frictional ring sheet 38 is made of a low-frictional material such as a tetrafluoroethylene resin.

The shutter unit 36 is provided with shutter blades 36a (see FIGS. 8 through 10). The shutter unit 36 drives the shutter blades 36a to open and close in accordance with information on an object brightness. The zoom lens barrel 10 is provided therein with a flexible printed wiring board (flexible PWB) F, one end (front end) of which is fixed to the shutter unit 36 (see FIGS. 8 through 10). A drive signal is given to the shutter unit 36 via the flexible PWB F. As shown in FIGS. 8 through 10, the flexible PWB F extends rearward from the shutter unit 36 on an upper surface of the flexible PWB fixing member 35c therealong, and bends radially inwards to subsequently extend forward. Subsequently, the flexible PWB F is fixed to a lower surface of the flexible PWB fixing member 35c with adhesive tape, and bends radially inwards to extend rearward. Subsequently, the flexible PWB F extends through the CCD holding frame 13 via a through-slot 13a (see FIG. 1) formed thereon, and bends radially outwards to extend upwards along a rear surface of the CCD holding frame 13. Subsequently, flexible PWB F bends to extend forward and above the stationary barrel 11. The second lens group moving frame 31 is provided on a rear surface thereof with a flexible PWB support member 31j (see FIG. 8) for supporting (taking up) the slack of the flexible PWB.

The zoom lens barrel 10 is provided with a third lens frame 39 to which the third lens group L3 is fixed. As shown in FIG. 1, the third lens frame 39 is guided in the optical axis direction via a pair of linear guide rods 40 which extend parallel to the optical axis O. The front and rear ends of each linear guide rod 40 are fixed to the shaft holding member 12 and the CCD holding frame 13, respectively. The third lens frame 39 is driven to move in the optical axis direction by rotation of a feed screw shaft 41 which is driven forward and backward by a step motor (not shown) in accordance with information on a photographing distance.

Figure 20:
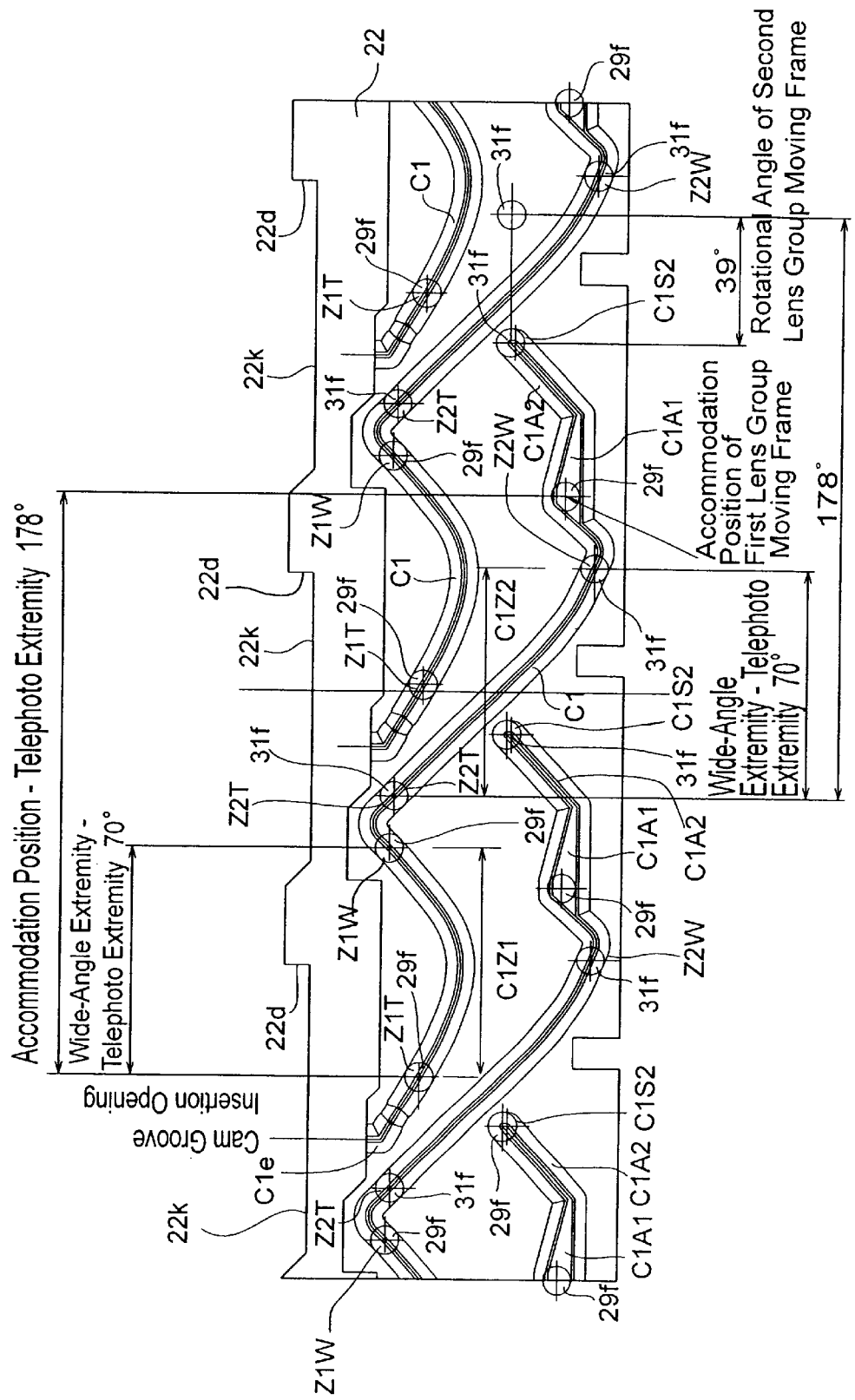
FIG. 20 is a developed view of an inner peripheral surface of the cam ring.

A zooming operation is carried out by moving the first and second lens groups L1 and L2 (the first and second lens group moving frames 29 and 31) in the optical axis direction relative to the third lens group L3 while varying the distance therebetween. The cam ring 22 is provided, on an inner peripheral surface thereof at equi-intervals (intervals of 120 degrees) in a circumferential direction of the cam ring 22, with three lens-drive cam grooves C1. The first lens group moving frame 29 and the second lens group moving frame 31, which are guided linearly in the optical axis direction without rotating about the optical axis O, move in the optical axis direction by rotation of the cam ring 22 in accordance with the profiles of the lens-drive cam grooves C1. FIG. 20 shows a developed view of the lens-drive cam grooves C1. The zoom lens barrel 10 is characterized in that each lens-drive cam groove C1 is formed as a continuous bottomed groove to have respective cam groove portions for the first and second lens groups L1 and L2, and that the first and second lens groups L1 and L2 are released from the constraints of the three lens-drive cam grooves C1 at their respective accommodation positions so that the first and second lens groups L1 and L2 can be accommodated to be positioned close to each other until the first lens group supporting frame 32 and the second lens group moving frame 31 come into contact with each other.

Namely, three follower pins (first cam follower) 29f which are projected radially outwards from the first lens group moving frame 29 and three follower pins (second cam follower) 31f which are projected radially outwards from the second lens group moving frame 31 are slidably engaged in the three lens-drive cam grooves C1, respectively. Each lens-drive cam groove C1, which is formed as a continuous bottomed groove, has a function to move the first and second lens groups L1 and L2 in their respective zoom paths. Unlike the present embodiment of the zoom lens barrel 10, in a conventional zoom lens barrel having a cam ring for driving a plurality of movable lens groups, a set of cam grooves is necessary for each of the plurality of movable lens groups.

As shown in FIG. 20, each lens-drive cam groove C1 is provided at one end thereof with an insertion end C1e via which one of the three follower pins 29f of the first lens group moving frame 29 and one of the three follower pins 31f of the second lens group moving frame 31 are inserted into the lens-drive cam groove C1. Each lens-drive cam groove C1 is further provided with a first-lens-group zooming section (front lens group moving section/photographing section) C1Z1, a second-lens-group zooming section (rear lens group moving section/photographing section) C1Z2, a first-lens-group accommodation portion C1A1, a connecting portion C1A2 and a second-lens-group-accommodation end portion C1S2, in that order from the insertion end C1e. The opposite ends (left and right ends as viewed in FIG. 20) of the first-lens-group zooming section C1Z1 determines a telephoto extremity Z1T and a wide-angle extremity Z1W of the first lens group L1, respectively. The opposite ends (left and right ends as viewed in FIG. 20) of the second-lens-group zooming section C1Z2 determines a telephoto extremity Z2T and a wide-angle extremity Z2W of the second lens group L2, respectively. As shown in FIG. 20, in this particular embodiment of the zoom lens barrel 10, the angle of rotation of the cam ring 22 when driving each of the first and second lens group moving frames 29 and 31 from the accommodation position to the telephoto extremity is predetermined at 178 degrees, and the angle of rotation of the cam ring 22 when driving each of the first and second lens group moving frames 29 and 31 from the wide-angle extremity to the telephoto extremity is determined at 70 degrees.

As shown in FIG. 20, the width of the first-lens-group accommodation portion C1A1 of the lens-drive cam groove C1 in the optical axis direction (the vertical direction as viewed in FIG. 20) is greater than the width of the other portions of the lens-drive cam groove C1 so that the associated follower pin 29f can move freely in the first-lens-group accommodation portion C1A1. Namely, the first-lens-group accommodation portion C1A1 extends in a circumferential direction of the cam ring 22, and also widens in the optical axis direction to form a clearance for the associated follower pin 29f of the first lens group moving frame 29 to be movable in the optical axis direction by an amount of movement corresponding to the range of adjustment of the thread engagement position of the male thread portion of the first lens group supporting frame 32 with respect to the female thread portion 29d of the inner flange 29g. The second-lens-group-accommodation end portion C1S2, which is one end of the connecting portion C1A2 on the side opposite from the first-lens-group accommodation portion C1A1, is shaped to form a clearance for the associated follower pin 31f of the second lens group moving frame 31 to be slightly movable both in the optical axis direction and in a circumferential direction of the cam ring 22 when the associated follower pin 31f is engaged in the second-lens-group-accommodation end portion C1S2.

Figure 16:
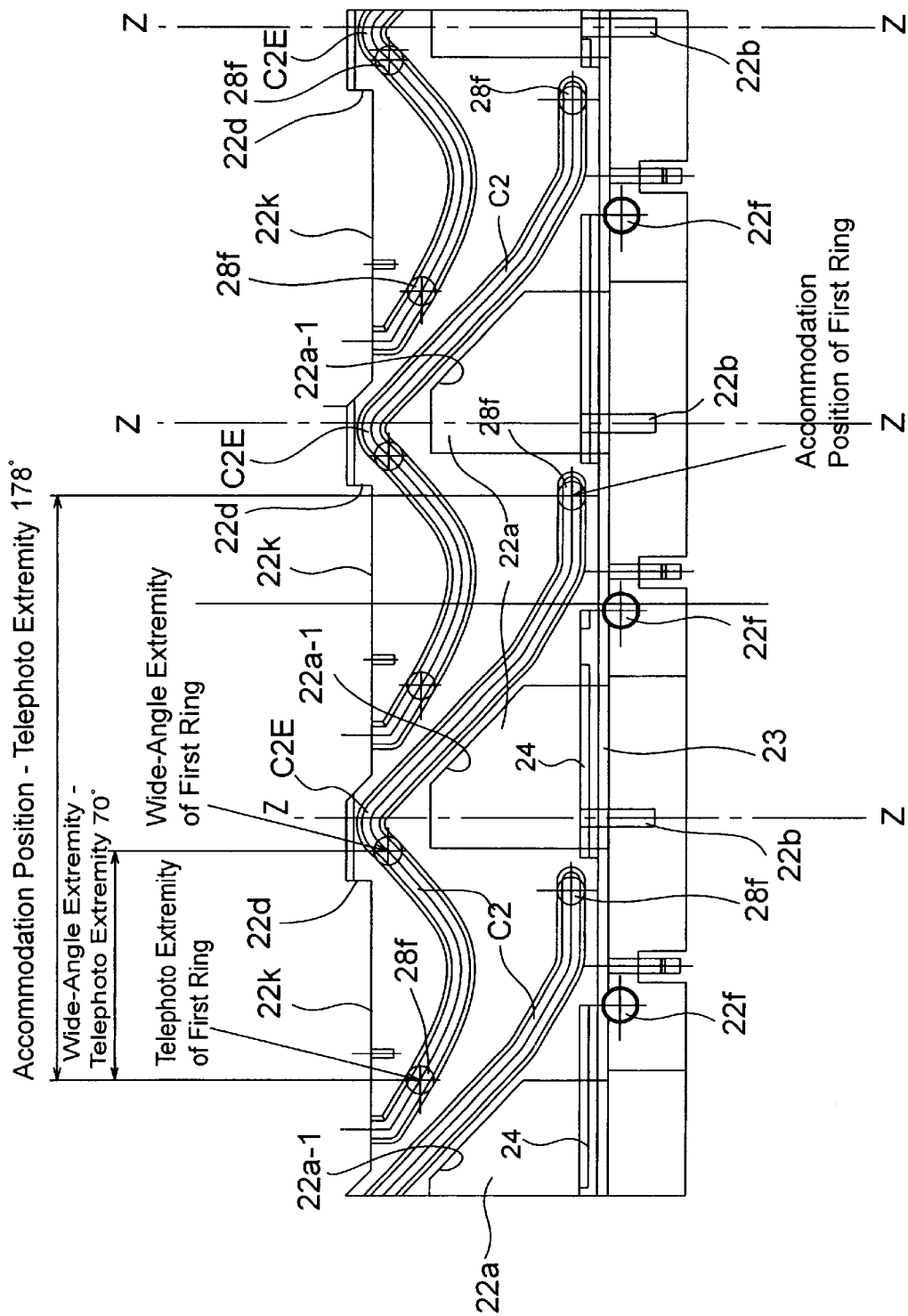
FIG. 16 is a developed view of an outer peripheral surface of the cam ring.

As shown in FIG. 16, which shows a developed view of the outer peripheral surface of the cam ring 22, the three engaging recesses 22a of the cam ring 22 are formed so as not to interfere with the three cam grooves C2, which are formed on an outer peripheral surface of the cam ring 22 so as to have a substantially V-shaped profile (cam path) in a development view as shown in FIG. 16. The front end of each engaging recess 22a is positioned just behind an adjacent peak (frontmost peak portion) C2E of the associated cam groove C2 which is the frontmost portion of the cam groove C2. The front end of each engaging recess 22a is formed to have an oblique surface 22a-1 so that each engaging recess 22a does not interfere with the associated cam grooves C2. The front end portion of each rotation-transmission arm 20b is formed to have an oblique cutout portion 20d which is shaped to correspond to the oblique surface 22a-1 of the engaging recess 22a (See FIG. 11B). Furthermore, as shown in FIG. 16, the three guide keys 22b are provided in the close vicinity of the three bayonet prongs 24, and are each formed so as to extend along an extension line Z which extends parallel to the optical axis through the corresponding peak C2E. In other words, the three guide keys 22b are each provided at a circumferential position of longest portion of a corresponding engaging recess 22a in a direction parallel to the optical axis. Accordingly, since the three guide keys 22b can be made long in the direction parallel to the optical axis, the linear guidance precision thereof can be increased.

The relative angular positions of the three follower pins 29f and the three follower pins 31f about the optical axis O are determined so that each follower pin 29f and each follower pin 31f are respectively positioned in the first-lens-group accommodation portion C1A1 and the second-lens-group-accommodation end portion C1S2 of the connecting portion C1A2 when the cam ring 22 is positioned in an accommodation position thereof (see FIG. 20). The first-lens-group accommodation portion C1A1 and the second-lens-group-accommodation end portion C1S2 of the connecting portion C1A2, to some extent, do not constrain movement of the associated follower pins 29f and 31f, respectively. Namely, each follower pin 29f and each follower pin 31f can move in the first-lens-group accommodation portion C1A1 and the second-lens-group-accommodation end portion C1S2 of the connecting portion C1A2, respectively, in the optical axis direction because of the clearance formed between each groove portion and the associated follower pin. This clearance contributes to further miniaturization of the length of the zoom lens barrel 1 in an accommodation position thereof.

Since the three helical compression springs 30 press the first lens group moving frame 29 rearwards in the optical axis direction as described above, the lens pressure ring 32a that is supported by the first lens group moving frame 29, can retract up to a mechanically contacting point P (see FIG. 8) where the lens pressure ring 32a comes in contact with the low-frictional ring sheet 38 that is fixed to the front surface of the shutter pressure plate 37, due to the clearance between the first-lens-group accommodation portion C1A1 of each lens-drive cam groove C1 of the cam ring 22 and the associated follower pin 29f of the first lens group moving frame 29. Likewise, the flexible PWB support member 31j of the second lens group moving frame 31 can retract up to a mechanically contacting point Q (see FIG. 8) where the second lens group moving frame 31 comes in contact with the third lens frame 39 due to a clearance between the second-lens-group-accommodation end portion C1S2 of the connecting portion C1A2 of each lens-drive cam groove C1 of the cam ring 22 and the associated follower pin 31f of the second lens group moving frame 31.

Due to such structures of the mechanically contacting points P and Q, the length of the zoom lens barrel 10 in an accommodation position thereof is successfully reduced as compared with a conventional zoom lens barrel in which the respective accommodation positions of first and second lens groups which correspond to the first and second lens groups L1 and L2 of the present embodiment of the zoom lens barrel are precisely determined by associated cam grooves. Furthermore, as shown in FIG. 8, the third lens frame 39 can retract up to a mechanically contacting point R where the third lens frame 39 comes in contact with the CCD holding frame 13 while compressing a helical compression spring 42, which is fitted on the feed screw shaft 41 to be positioned between the third lens frame 39 and the CCD holding frame 13 to bias the third lens frame 39 forward.

FIG. 8 shows an accommodation position of the zoom lens barrel 10 where the first lens group moving frame 29 (lens pressure ring 32a) is in contact with the low-frictional ring sheet 38, where the second lens group moving frame 31 is in contact with the third lens frame 39, and where the third lens frame 39 is in contact with the CCD holding frame 13.

The amount of rearward movement of the first lens group moving frame 29 relative to the second lens group moving frame 31 depends on the position of the first lens group supporting frame 32 relative to the first lens group moving frame 29, since the position of the second lens group supporting frame 32 relative to the first lens group moving frame 29 varies by an adjustment of the thread engagement position of the male thread portion of the first lens group supporting frame 32 with respect to the female thread portion 29d of the inner flange 29g during assembly. Such a variation due to the adjustment is absorbed by extension or compression of the helical compression springs 30 so that the zoom lens barrel 10 can be accommodated with the lens pressure ring 32a, the second lens group moving frame 31, and the third lens frame 39 being in contact with the low-frictional ring sheet 38, the third lens frame 39, and the CCD holding frame 13 at the mechanically contacting points P, Q and R, respectively.

If the cam ring 22 rotates in a direction from the accommodation position toward a photographing position in the zooming groove portion 11a4, each follower pin 29f of the first lens group moving frame 29 which is engaged in the first-lens-group accommodation portion C1A1 moves from the first-lens-group accommodation portion C1A1 to the first-lens-group zooming section C1Z1 via the second-lens-group zooming section C1Z2, while each follower pin 31f of the second lens group moving frame 31 which is engaged in the connecting portion C1A2 moves from the connecting portion C1A2 to the second-lens-group zooming section C1Z2 via the first-lens-group accommodation portion C1A1. Accordingly, the second-lens-group zooming sections C1Z2 of the three lens-drive cam grooves C1 that are used for driving the three follower pins 31f of the second lens group moving frame 31 are used as mere passing sections for the three follower pins 29f of the first lens group moving frame 29 via which the three follower pins 29f move from the first-lens-group accommodation position to the photographing position. The above-described structure which provides such passing sections is advantageous to reduce the number of cam grooves which are to be formed on the cam ring 22, which is in turn advantageous to reduce the angle of inclination of each cam groove with respect to a circumferential direction of the cam ring 22.

Figure 17A:
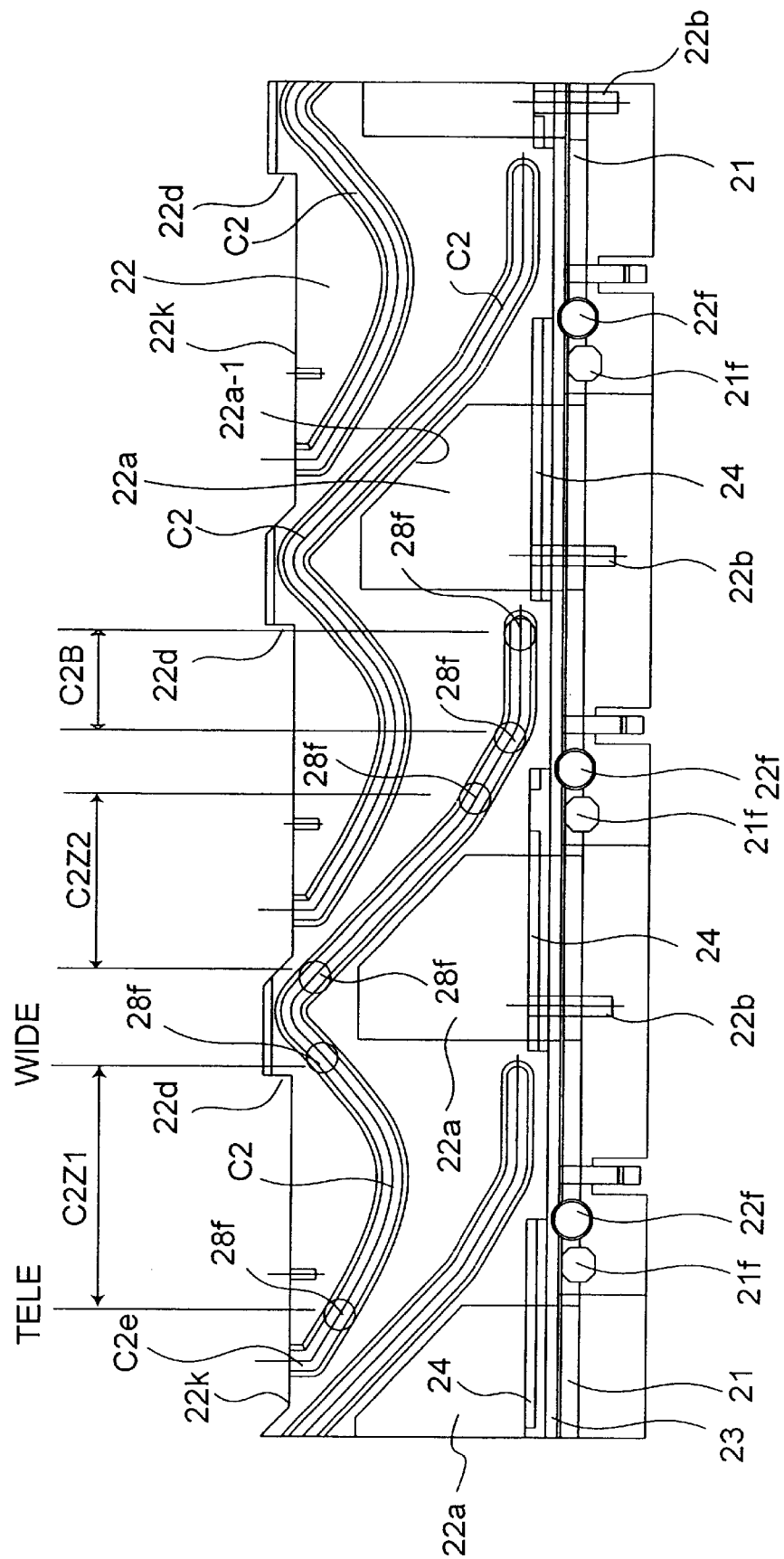
FIG. 17A is a developed view of outer peripheral surfaces of the cam ring and the biasing ring fitted on the rear end of the cam ring.
Figure 17B:
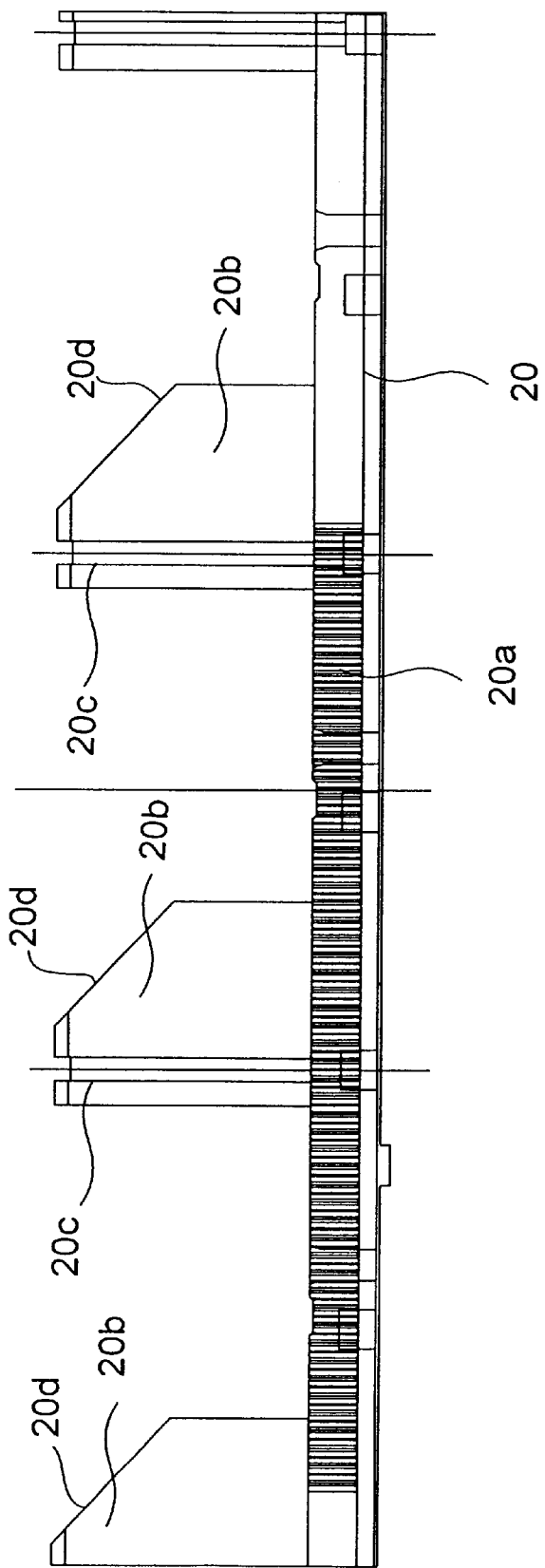
FIG. 17B is a developed view of an outer peripheral surface of the rotational ring.
Figure 18:
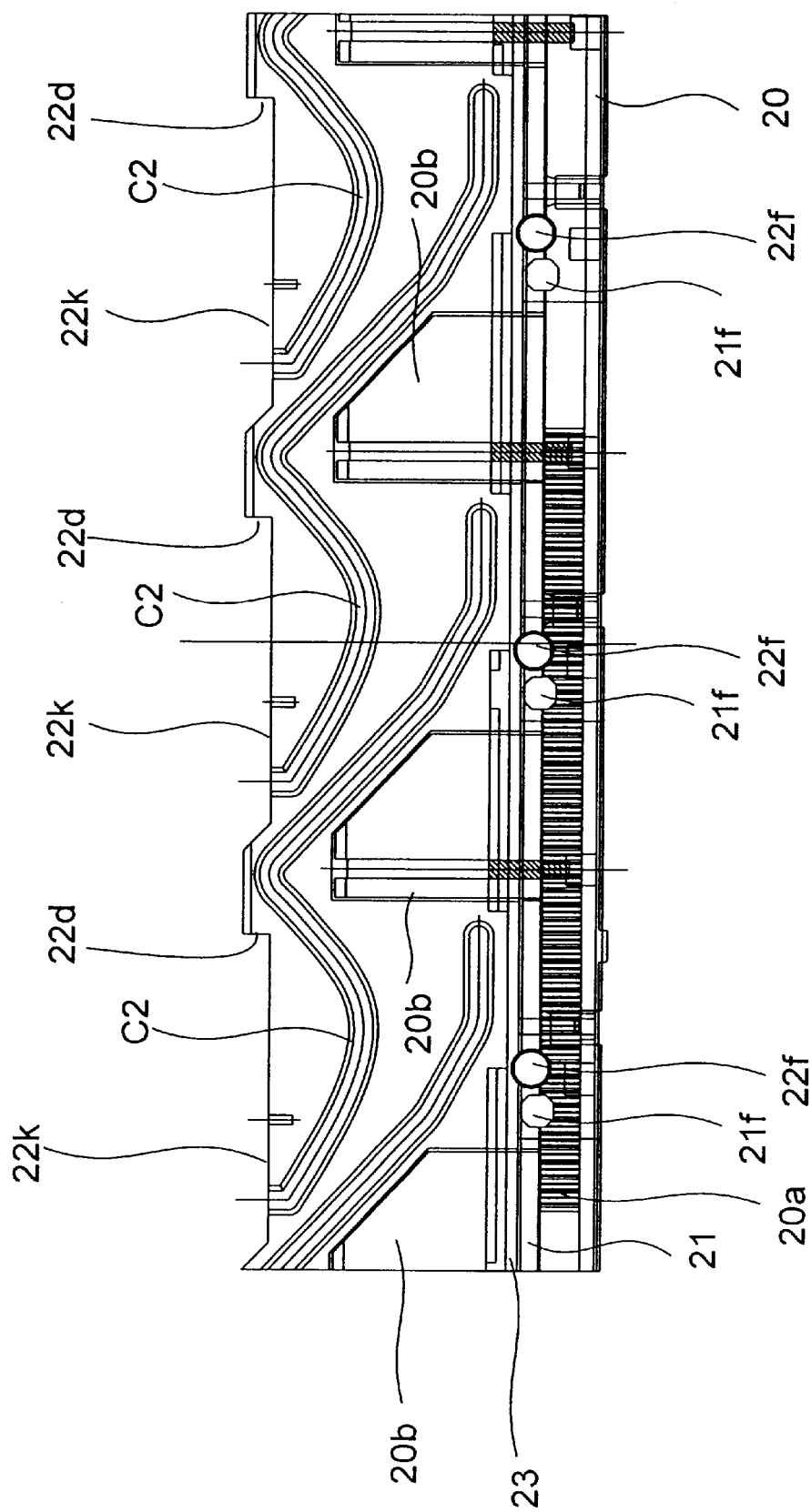
FIG. 18 is a developed view of outer peripheral surfaces of the cam ring, the rotational ring and the biasing ring in the accommodation position shown in FIG. 12.
Figure 19:
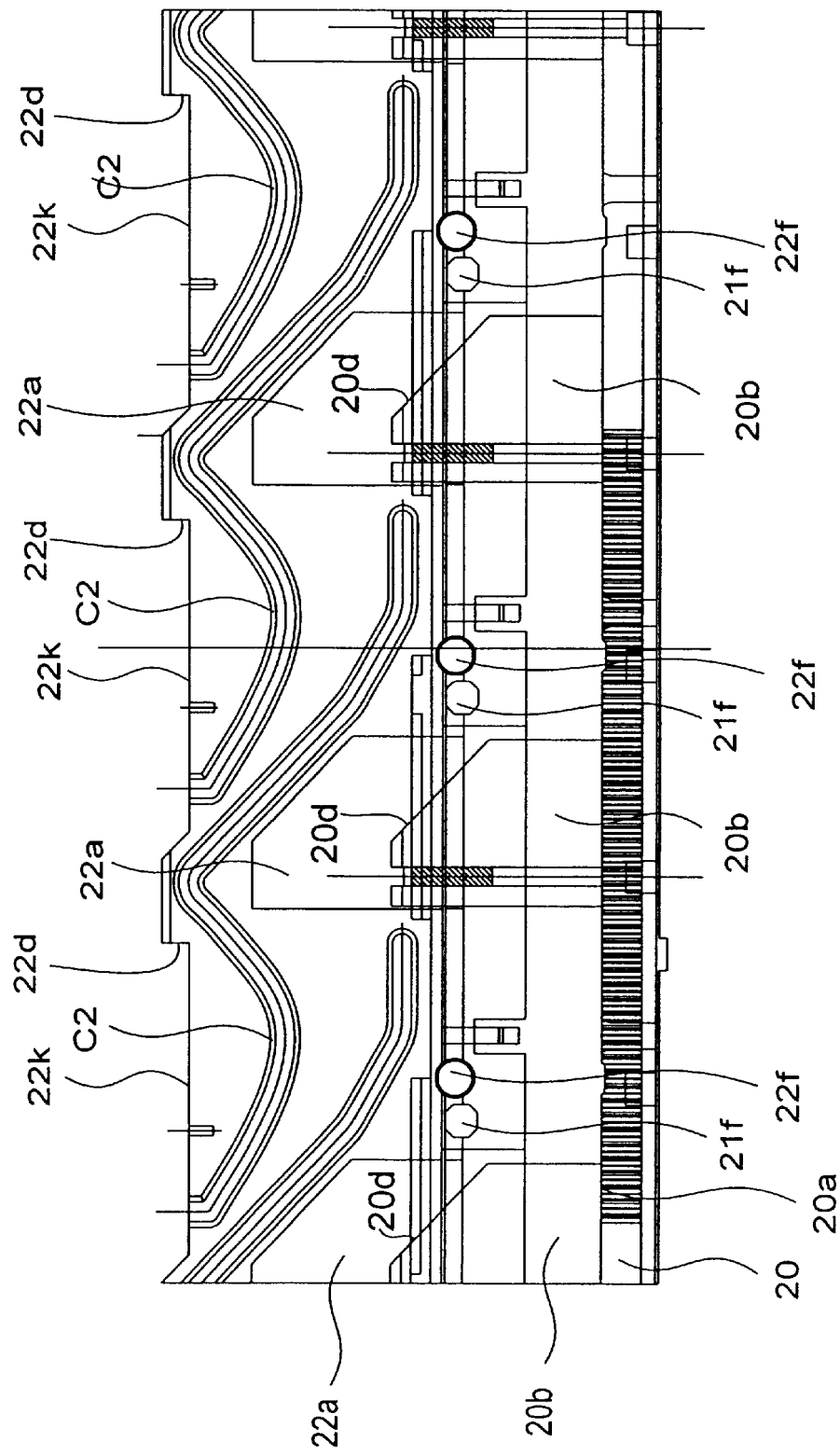
FIG. 19 is a developed view of outer peripheral surfaces of the cam ring, the rotational ring and the biasing ring in the photographing position shown in FIG. 13.

The first ring 28 moves in the optical axis direction independent of the first lens group moving frame 29 in a moving path which is substantially the same as the moving path of the first lens group moving frame 29. Accordingly, the cam ring 22 is provided, on an outer peripheral surface at equi-intervals (intervals of 120 degrees) in a circumferential direction thereof, with the three cam grooves C2 (see FIGS. 16 through 19). The first ring 28 is provided, on an inner peripheral surface at equi-intervals in a circumferential direction thereof, with three follower pins 28f which are slidably engaged in the three cam grooves C2 of the cam ring 22, respectively. The profiles of the cam grooves C2 resemble those of the lens-drive cam grooves C1. As shown in FIG. 17A, each cam groove C2 is provided at one end thereof with an insertion end C2e via which one of the three follower pins 28f of the first ring 28 is inserted into the cam groove C2. Each cam groove C2 is further provided with a first section C2Z1 which corresponds to the first-lens-group zooming section C1Z1, a second section C2Z2 which corresponds to the second-lens-group zooming section C1Z2, and a barrier drive section C2B. The barrier drive section C2B extends in a circumferential direction of the cam ring 22, so that the cam ring 22 rotates about the optical axis O without moving in the optical axis direction relative to the first ring 28 as long as each follower pin 28f is engaged in the barrier drive section C2B. As shown in FIG. 16, in this particular embodiment of the zoom lens barrel 10, the angle of rotation of the cam ring 22 when driving the first ring 28 from the accommodation position to the telephoto extremity is predetermined at 178 degrees, and the angle of rotation of the cam ring 22 when driving the first ring 28 from the wide-angle extremity to the telephoto extremity is determined at 70 degrees.

By providing the first ring 28, which extends forward so that an outer peripheral surface thereof is exposed to the outside of the zoom lens barrel 10, as an element separate from the first lens group moving frame 29, and by guiding the first ring 28 in the optical axis direction via a cam mechanism independent of the first lens group moving frame 29 as described above, external forces applied to the first ring 28 can be prevented from being transferred to the first lens group L1 via the first lens group moving frame 29, which in turn prevents deterioration in optical performance of the zoom lens barrel 10 due to eccentricity of the optical axis of the first lens group L1. In addition, the structure of the cam ring 22 wherein the three lens-drive cam grooves C1 and the three cam grooves C2, whose cam profiles are similar (though differing slightly in shape) to each other, are formed on the cam ring 22 in slightly different positions thereon in the optical axis direction does not increase the wall thickness of the cam ring 22. Moreover, external forces applied to the first ring 28 rearward in the optical axis direction can be received by the first lens group moving frame 29 via the three follower pins 29f.

Furthermore, since the three follower pins 28f, which are respectively engaged in the three cam grooves C2, and the three follower pins 29f, which are respectively engaged in the three lens-drive cam grooves C1, are respectively aligned side by side in a direction parallel to the optical axis O, the strength of the spring force of the three helical compression springs 30 that are held between the first ring 28 and the first lens group moving frame 29 to bias the first ring 28 and the first lens group moving frame 29 in opposite directions away from each other varies little even if the cam ring 22 rotates relative to the first ring 28 and the first lens group moving frame 29.

As shown in FIG. 1, the barrier unit 43 includes a barrier blade support front plate 45, a pair of barrier blades 46, two torsion springs 47 and a barrier blade support rear plate 48, and is fixed to the front end of the first ring 28 to be positioned therein, in front of the inner flange 28b. The barrier drive ring 44 is positioned in the first ring 28 and held between the barrier unit 43 and the inner flange 28b of the first ring 28 to be rotatable freely about the optical axis O. The cam ring 22 is provided at the front end thereof with three recesses 22k (see FIGS. 16 through 20). The barrier drive ring 44 is provided on an outer peripheral surface thereof with three engaging portions 44a. The cam ring 22 is provided at one end of each recesses 22k with a rotation transfer face 22d which extends parallel to the optical axis O and extends through a corresponding circumferential slot 28z (see FIG. 1) formed on the inner flange 28b of the first ring 28. As shown in FIGS. 16 through 20, the three recesses 22k are formed on the cam ring 22 at portions thereon other than the portions where the three cam grooves C2 are formed.

As shown in FIG. 1, the barrier unit 43, which includes the barrier blade support front plate 45, the pair of barrier blades 46, the two torsion springs 47 and the barrier blade support rear plate 48, is formed as a single assembly in advance. The barrier blade support front plate 45 is provided at the center thereof with a photographing aperture 45a, and is further provided, on a rear surface thereof on opposite sides of the photographing aperture 45a, with two bosses (not shown), respectively, which extend rearwards. Each barrier blade 46 is provided at one end thereof with a hole in which one of the two bosses is engaged so that each barrier blade 46 is rotatable about the associated boss. The two torsion springs 47 bias the pair of barrier blades 46 to rotate in opposite rotational directions to shut the pair of barrier blades 46, respectively. The pair of barrier blades 46 are supported between the barrier blade support front plate 45 and the barrier blade support rear plate 48. The barrier blade support rear plate 48 is provided at the center thereof with a central aperture which is aligned with the photographing aperture 45a in the optical axis direction, and is further provided on opposite sides of the central aperture with two slots 48a. Each barrier blade 46 is provided in the vicinity of the associated boss with an engaging projection 46a (only one of which appears in FIGS. 8 through 10) which extends rearward, toward the barrier drive ring 44, to pass through the associated slot 48a of the barrier blade support rear plate 48.

The barrier drive ring 44 is biased to rotate in a direction to open the pair of barrier blades 46 by a helical extension spring 49 whose opposite ends are hooked on an engaging projection 44b formed on the barrier drive ring 44 and an engaging projection 28h formed on a front surface of the inner flange 28b of the first ring 28. The spring force of the helical extension spring 49 is greater than the total spring force of the two torsion springs 47. The two drive projections 44c of the barrier drive ring 44 come into contact with the two engaging projections 46a of the pair of barrier blades 46 to open the pair of barrier blades 46, respectively, when the barrier drive ring 44 is in a fully rotated position thereof due to the spring force of the helical extension spring 49. If the barrier drive ring 44 is rotated in a direction to close the pair of barrier blades 46 against the spring force of the helical extension spring 49, the two drive projections 44c respectively move away from the two engaging projections 46a of the pair of barrier blades 46 so that the pair of barrier blades 46 are closed by the spring force of the two torsion springs 47.

The three rotation transfer faces 22d of the cam ring 22 respectively come into contact with the three engaging portions 44a of the barrier drive ring 44 to press the three engaging portions 44a against the spring force of the helical extension spring 49 to rotate the barrier drive ring 44. When the cam ring 22 is in the accommodation position thereof, the three rotation transfer faces 22d are respectively in contact with the three engaging portions 44a of the barrier drive ring 44 via the three circumferential slots 28z formed on the inner flange 28b of the first ring 28. The barrier drive ring 44 is rotated about the optical axis O against the spring force of the helical extension spring 49 to close the pair of barrier blades 46. If the cam ring 22 rotates about the optical axis O in a barrier opening direction (counterclockwise as viewed from the front of the zoom lens barrel 10) with respect to the first ring 28, with the three follower pins 28f being respectively engaged within the barrier drive sections C2B of the three cam grooves C2 of the cam ring 22, the three rotation transfer faces 22d are respectively disengaged from the three engaging portions 44a of the barrier drive ring 44 so that the barrier drive ring 44 is rotated in a direction to open the pair of barrier blades 46 by the spring force of the helical extension spring 49.

The barrier unit 43 having the above described structure is fitted into the front end opening of the first ring 28 from the front thereof. The barrier blade support front plate 44 is provided on an outer peripheral edge thereof with a plurality of engaging portions which are respectively engaged with a corresponding plurality of hooks (not shown) formed on an inner peripheral surface of the front end opening of the first ring 28 to prevent the barrier unit 43 from coming off the front of the first ring 28. The barrier drive ring 44 is held between the barrier unit 43 and the inner flange 28b of the first ring 28 to be rotatable about the optical axis O.

As has been described above, the zooming groove portion 11a4 (see FIG. 28) of each cam groove 11a of the stationary barrel 11 extends in a circumferential direction of the stationary barrel 11 and does not extend in the optical axis direction. Therefore, the cam ring 22 rotates about the optical axis O without moving in the optical axis direction when the three follower pins 22f of the cam ring 22 and the three follower pins 21f of the biasing ring 21 follow the three zooming groove portions 11a4 of the three cam grooves 11a in the zooming section, respectively. In the zooming section that is determined by the zooming groove portion 11a4, it is necessary to remove backlash and play between the three follower pins 22f and the zooming groove portions 11a4 of the three cam grooves 11a.

To remove such backlash and play, each of the three follower pins 21f and the associated one of the three follower pins 22f are engaged in a common cam groove of the three cam grooves 11a of the stationary barrel 11 at slightly different circumferential positions as shown in FIG. 28, and each follower pin 21f of the biasing ring 21 and each follower pin 22f of the cam ring 22 are pressed against a rear side edge of the associated cam groove 11a and a front side edge of the same cam groove 11a, respectively, by the spring force of the three compression helical springs 26. Due to this structure wherein the three follower pins 22f of the cam ring 22 are pressed against the front side edges of the zooming groove portion 11a4 of the three cam grooves 11a when engaged in the zooming groove portion 11a4, backlash and play between the three follower pins 22f and the zooming groove portions 11a4 of the three cam grooves 11a are removed.

In addition to the above described structures wherein the three linear guide grooves 29c are formed on an inner peripheral surface of the first lens group moving frame 29 while the three linear guide keys 31a, which are respectively engaged in the three linear guide grooves 29c, are formed on an outer peripheral surface of the second lens group moving frame 31, three circumferential recesses (wide-width engaging portion) 29h (see FIGS. 21A through 21J) are formed on the first lens group moving frame 29 at the front ends of the three linear guide grooves 29c, respectively. Each circumferential recess 29h allows the associated linear guide key 31a of the second lens group moving frame 31 to move therein in a circumferential direction about the optical axis O, i.e., allows the second lens group moving frame 31 to rotate about the optical axis O relative to the first lens group moving frame 29 in a range corresponding to the circumferential length of the circumferential recess 29h. The second lens group moving frame 31 can rotate about the optical axis O relative to the first lens group moving frame 29 along the three circumferential recesses 29h only when the second lens group moving frame 31 is in the vicinity of the accommodation position thereof.

Note that the first lens group moving frame 29 is provided on the inner flange 29g thereof with three circumferential slots 29j (see FIGS. 24 through 27). The second lens group moving frame 31 is provided at the front end thereof with three front projecting portions 31g on respective outer surfaces on which the three linear guide keys 31a are formed, respectively. When each linear guide key 31a is positioned in the associated circumferential recess 29h, i.e., when the second lens group L2 is in the vicinity of the accommodation position thereof, the three front projecting portions 31g of the second lens group moving frame 31 extend through the inner flange 29g of the first lens group moving frame 29 to project forward from the inner flange 29g via the three circumferential slots 29j, respectively. Accordingly, allowing the three linear guide keys 31a to project forward from the inner flange 29g through the three circumferential slots 29j, respectively, achieves the short length of the zoom lens barrel 10 in an accommodation position shown in FIG. 8.

Figure 21E:
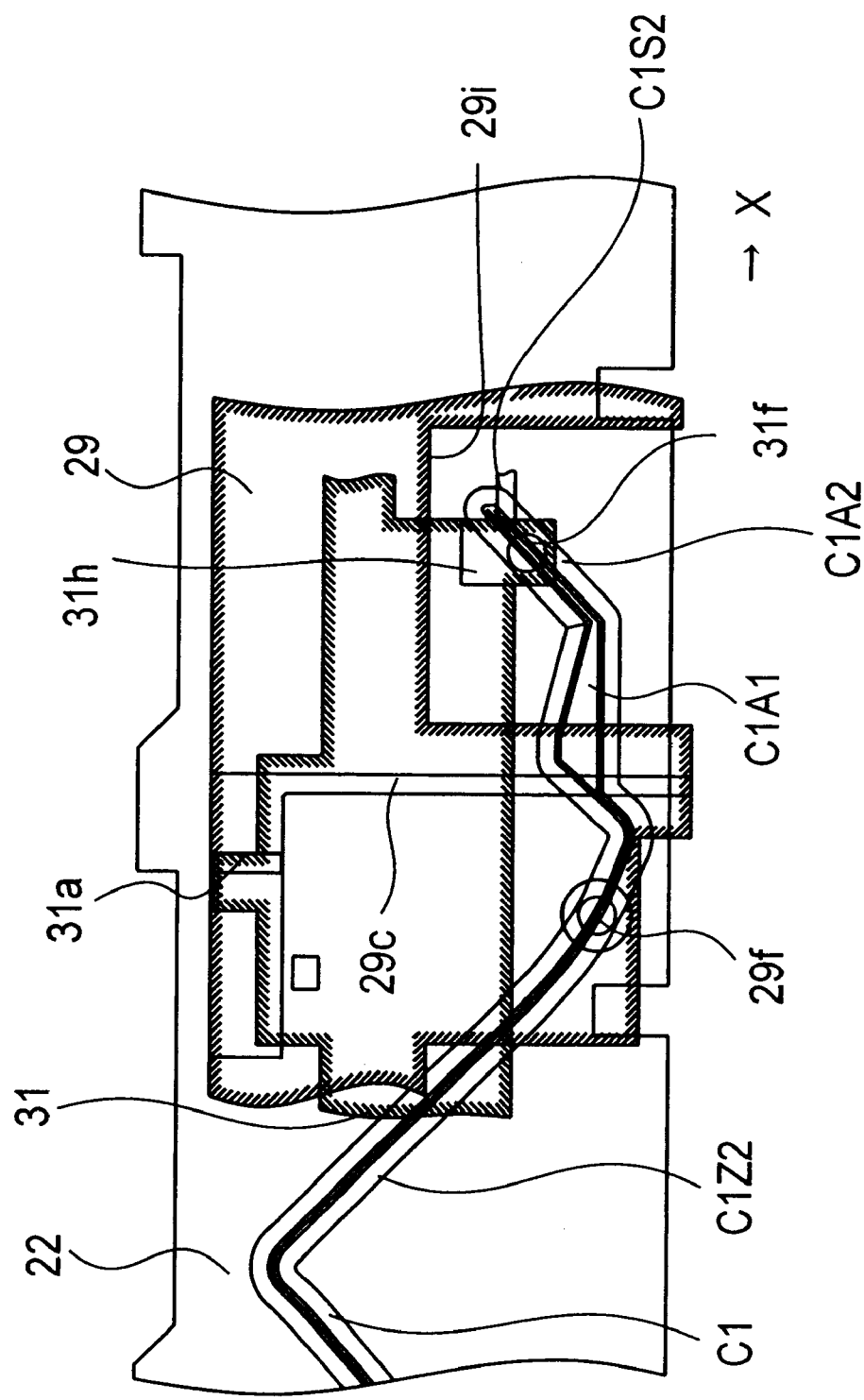

In a state where the zoom lens barrel 10 is in an accommodation position, i.e., where each of the three follower pins 29f of the first lens group moving frame 29 is engaged in the first-lens-group accommodation portion C1A1 of the associated lens-drive cam groove C1 as shown in FIG. 21A, a rotation of the cam ring 22 in a direction to extend the zoom lens barrel 10 (in a direction indicated by an arrow "X" in FIGS. 21A through 21J, i.e., counterclockwise as viewed from the front of the zoom lens barrel 10) causes each follower pin 29f of the first lens group moving frame 29 to move slightly from the first-lens-group accommodation portion C1A1 toward the second-lens-group zooming section C1Z2 of the associated lens-drive cam groove C1 as shown in FIG. 21B. At this time, each follower pin 31f of the second lens group moving frame 31 does not move out from the second-lens-group-accommodation end portion C1S2 of the connecting portion C1A2.

Further rotational movement of the cam ring 22 in the same direction X causes each follower pin 29f of the first lens group moving frame 29 to further move slightly toward the second-lens-group zooming section C1Z2 while moving rearward slightly in the optical axis direction as shown in FIG. 21C. At the same time, since each follower pin 31f does not move out from the second-lens-group-accommodation end portion C1S2 of the connecting portion C1A2, front end surfaces (upper end surfaces as viewed in FIG. 21C) of the three cutout portions 29i of the second lens group moving frame 29 come into contact with front end surfaces of the three engaging projections 31h of the second lens group moving frame 31, respectively, as shown in FIG. 21C.

Further rotational movement of the cam ring 22 in the same direction X causes each follower pin 29f of the first lens group moving frame 29 to further move slightly toward the second-lens-group zooming section C1Z2 while moving rearward (downward as viewed in FIG. 21D) in the optical axis direction so that the front end surfaces of the three cutout portions 29i press the three engaging projections 31h rearward in the optical axis direction, respectively, to move each follower pin 31f of the second lens group moving frame 31 in the connecting portion C1A2 from the second-lens-group-accommodation end portion C1S2 thereof toward the first-lens-group accommodation portion C1A1 as shown in FIG. 21D.

Further rotational movement of the cam ring 22 in the same direction X causes each follower pin 29f of the first lens group moving frame 29 to move forward in the second-lens-group zooming section C1Z2 in a left oblique direction with respect to the cam ring 22 as viewed in FIG. 21E, so that the three cutout portions 29i are respectively disengaged from the three engaging projections 31h, and at the same time, rear end surfaces of the three circumferential recesses 29h respectively come into contact with rear end surfaces of the three linear guide keys 31a as shown in FIG. 21E.

Figure 21F:
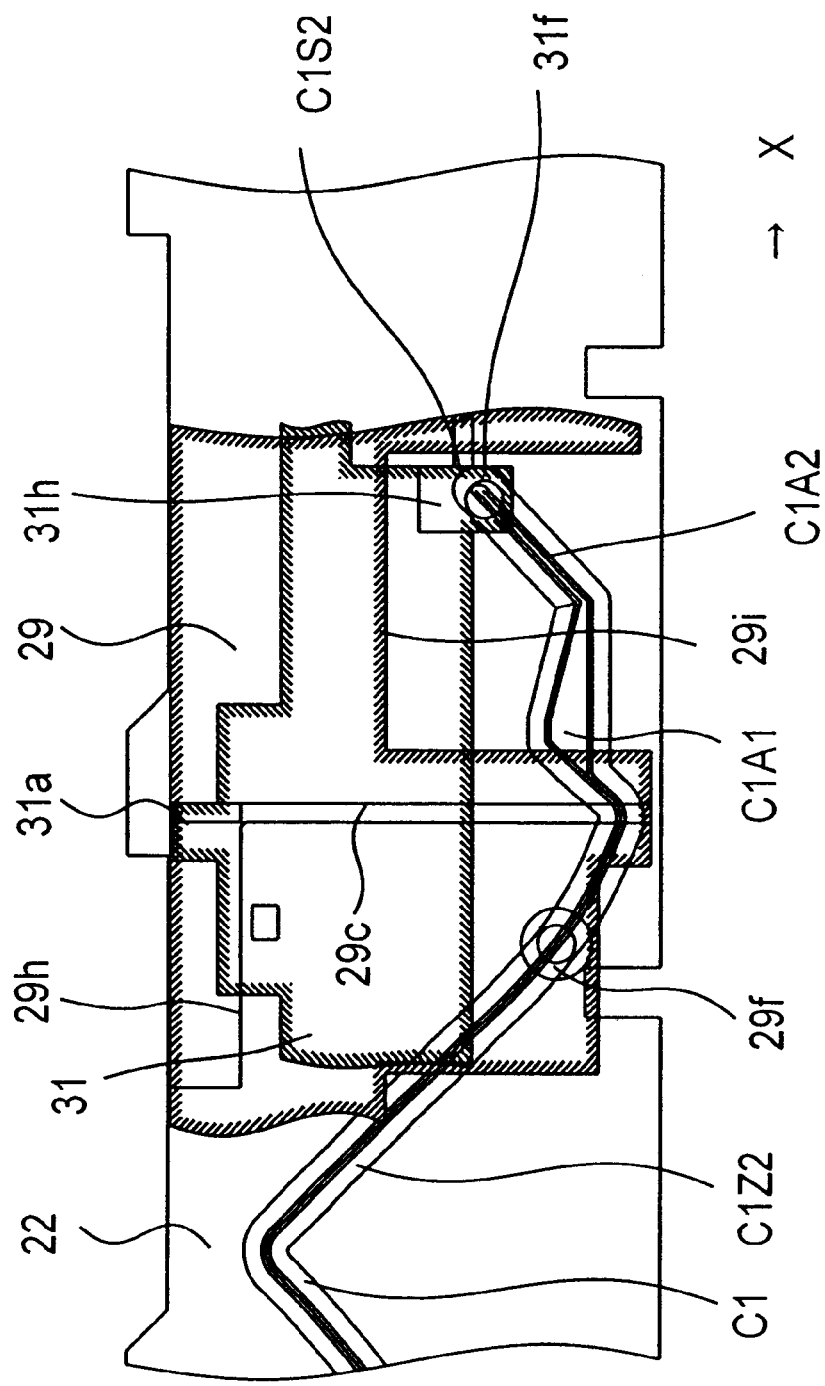

Further rotational movement of the cam ring 22 in the same direction X causes each follower pin 29f of the first lens group moving frame 29 to further move forward in the second-lens-group zooming section C1Z2 in the same left oblique direction with respect to the cam ring 22 so that the rear end surfaces of the three circumferential recesses 29h respectively press the rear end surfaces of the three linear guide keys 31a rearward in the optical axis direction, to thereby move each follower pin 31f of the second lens group moving frame 31 in the connecting portion C1A2 back toward the second-lens-group-accommodation end portion C1S2 thereof as shown in FIG. 21F. At this time, each linear guide keys 31a of the second lens group moving frame 31 is positioned in the associated linear guide groove 29c of the first lens group moving frame 29 in the vicinity of the front end thereof.

During the time the zoom lens barrel 10 moves from the position shown in FIG. 21A to the position shown in FIG. 21F, each linear guide keys 31a of the second lens group moving frame 31 rotates in the associated circumferential recess 29h in a circumferential direction of the first lens group moving frame 29 with respect to the first lens group moving frame 29. Rotating the second lens group moving frame 31 with respect to the first lens group moving frame 29 in such a manner makes it possible for the first lens group moving frame 29 to move forward smoothly without interfering with the second lens group moving frame 31. The second lens group moving frame 31 rotates about the optical axis O with respect to the first lens group moving frame 29 by 39 degrees (see FIG. 20) when the zoom lens barrel 10 moves from the position shown in FIG. 21A to the position shown in FIG. 21F.

Figure 21G:
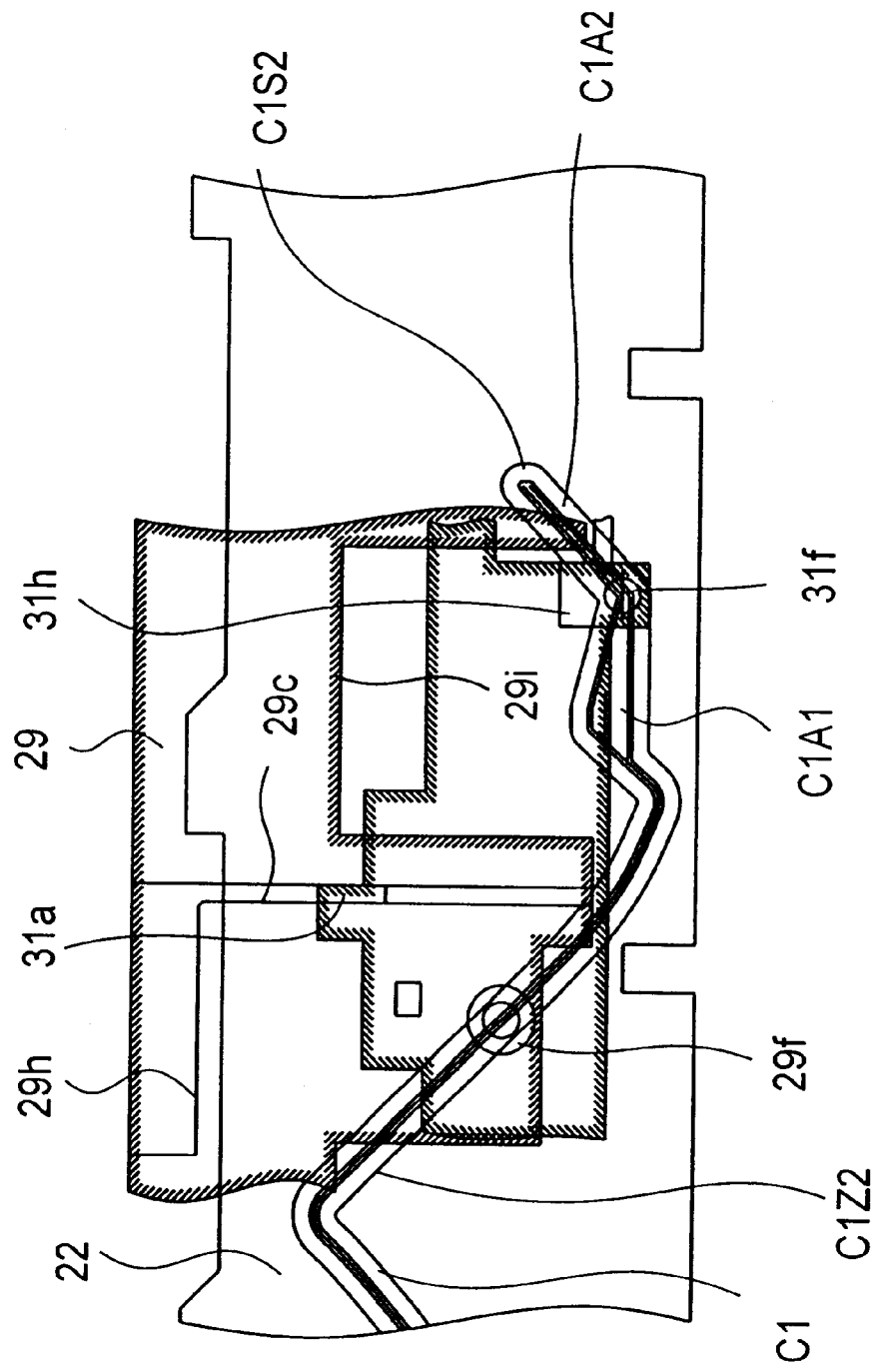

Further rotational movement of the cam ring 22 in the same direction X causes each follower pin 29f of the first lens group moving frame 29 to further move forward in the second-lens-group zooming section C1Z2 in the same left oblique direction with respect to the cam ring 22 so that each linear guide keys 31a of the second lens group moving frame 31 is properly engaged in the associated linear guide groove 29c as shown in FIG. 21G. Thereafter, the first lens group moving frame 29 and the second lens group moving frame 31 are prohibited from rotating relative to each other, while each follower pin 29f and the associated one of the three follower pins 31f move in the associated one of the three lens-drive cam grooves C1 in a direction to the left as viewed in FIG. 21G while maintaining a space between the follower pin 29f and the follower pin 31f in a circumferential direction.

Figure 21J:
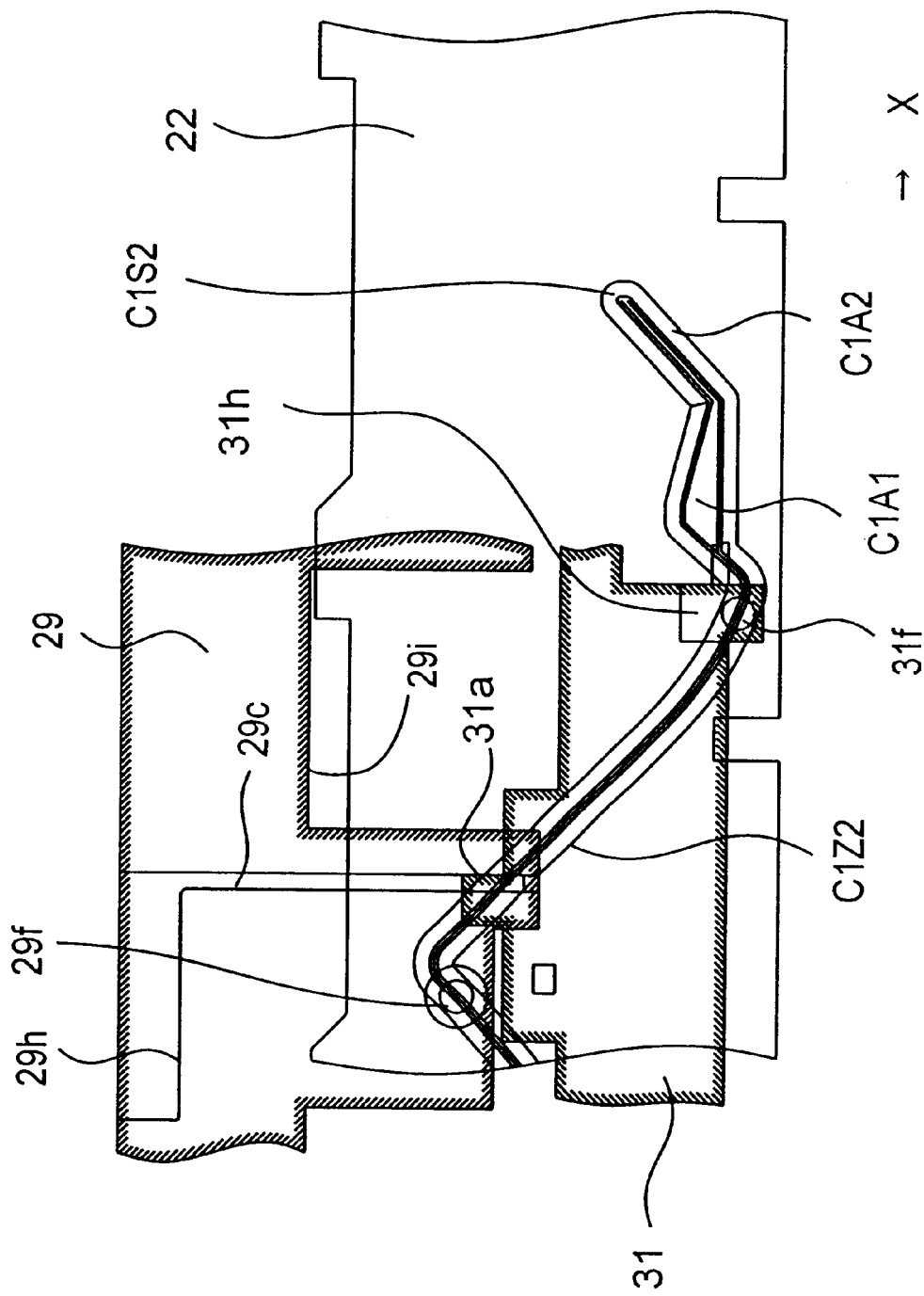

Subsequently, if the cam ring 22 continues to rotate in the direction X with each linear guide keys 31a of the second lens group moving frame 31 being engaged in the associated linear guide groove 29c of the first lens group moving frame 29, the first lens group moving frame 29 and the second lens group moving frame 31 move linearly in the optical axis direction without rotating about the optical axis O while changing a space in the optical axis therebetween by the movement of the three follower pins 29f and the three follower pins 31f in the three lens-drive cam grooves C1 in a direction toward the left as shown in FIGS. 21H through 21I. Consequently, each follower pin 29f and the associated one of the three follower pins 31f reach their respective wide-angle extremities in the associated one of the three lens-drive cam grooves C1 as shown in FIG. 21J.

Although not shown in the drawings, each follower pin 29f and the associated one of the three follower pins 31f reach their respective telephoto extremities in the associated one of the three lens-drive cam grooves C1 while maintaining a space therebetween in a circumferential direction if the cam ring 22 further continues rotating in the same direction X.

On the other hand, in a state where the zoom lens barrel 10 is in a photographing position, if the cam ring 22 rotates in a direction to retract the zoom lens barrel 10, i.e., in a direction opposite to the direction X, each follower pin 29f and each follower pin 31f move in an order reverse to the above described order, and return to the first-lens-group accommodation portion C1A1 and the connecting portion C1A2, respectively.

Figure 22:
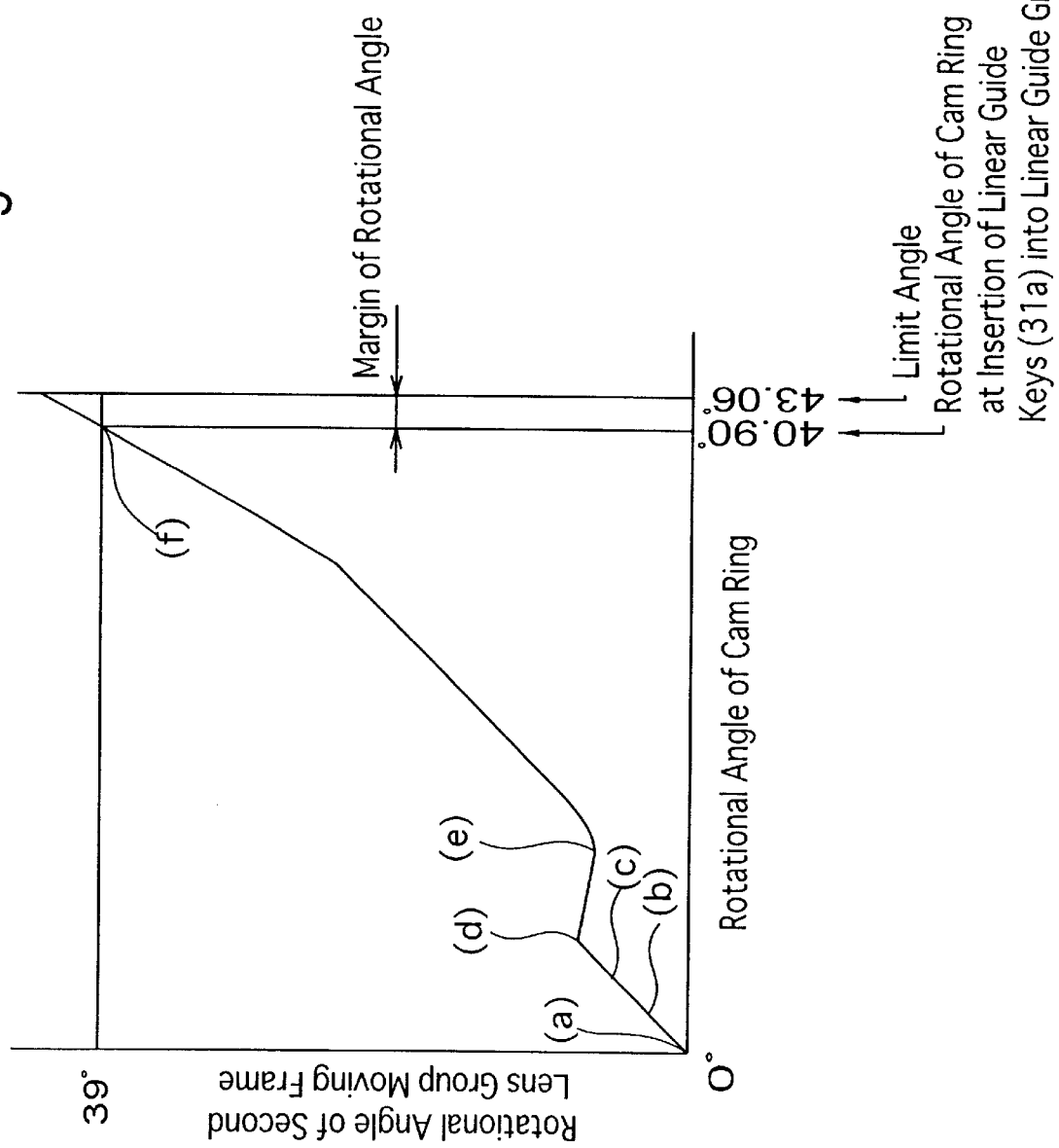
FIG. 22 is a graph showing variations in angle of rotation of the second lens group moving frame with respect to the cam ring.
Figure 23:
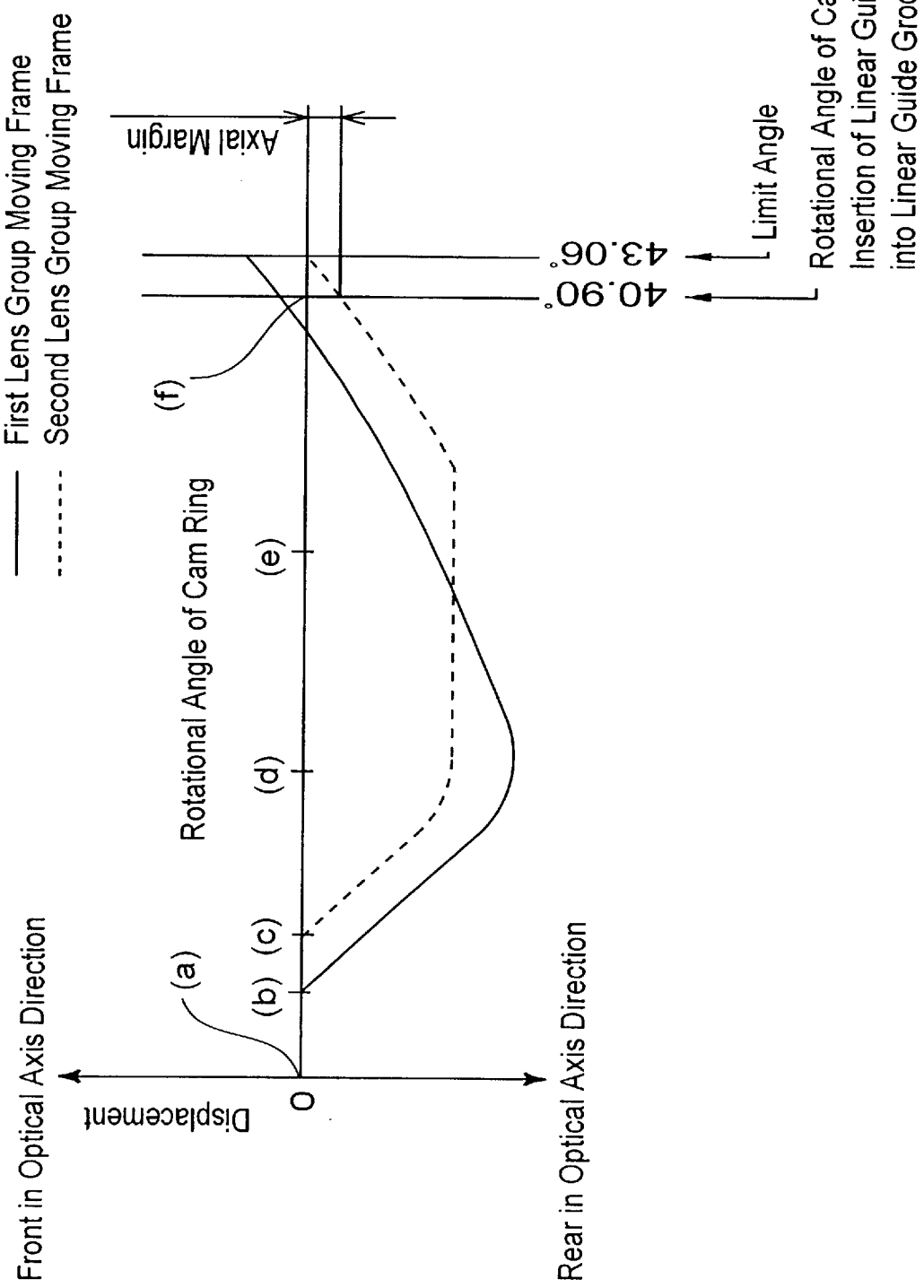
FIG. 23 is a graph showing the relationship among the angle of rotation of the cam ring and the axial positions of the first and second lens group moving frames, wherein their respective accommodation positions are represented by the point of origin (zero) of the graph.

FIG. 22 is a graph showing variations of the angle of rotation of the second lens group moving frame 31 with respect to the cam ring 22 from a state where the second lens group moving frame 31 is in an accommodation position to a state immediately after the three linear guide keys 31a are respectively engaged in the three linear guide grooves 29c, i.e., from the position shown in FIG. 21A to the position shown in FIG. 21F. FIG. 23 is a graph showing the relationship between the amount of displacement of the first lens group moving frame 29 from the accommodation position thereof (represented by "0" in FIG. 23) in the optical axis direction and the angle of rotation of the cam ring 22, and further showing the relationship between the amount of displacement of the second lens group moving frame 31 from the accommodation position thereof (represented by "0" in FIG. 23) in the optical axis direction and the angle of rotation of the cam ring 22. In each of FIGS. 22 and 23, (a), (b), (c), (d), (e) and (f) represent the rotational angles of the cam ring 22 in FIGS. 21A, 21B, 21C, 21D, 21E and 21F, respectively. The term "Limit Angle" shown in each of FIGS. 22 and 23 represents a specific angle of rotation of the cam ring 22, wherein the first and second lens group moving frames 29 and 31 cannot reach their respective telephoto extremities when the three linear guide keys 31a do not enter the associated linear guide groove 29c by the time the cam ring 22 has rotated to the specific angle of rotation of the cam ring 22.

When the first and second lens group moving frames 29 and 31 rotate relative to each other at their respective accommodation positions, friction (frictional resistance) is produced between the lens pressure ring 32a, which is supported by the first lens group moving frame 29, and the front surface of the shutter pressure plate 37, which is supported by the second lens group moving frame 31 via the shutter unit 36, if a low-frictional element such as the low-frictional ring sheet 38 is not fixed to the front surface of the shutter pressure plate 37, unlike the present invention. Namely, there is a possibility of the axial position of the first lens group supporting frame 32 deviating from the correct position thereof due to rotation thereof which can be caused by friction since the first lens group supporting frame 32 is coupled to the first lens group moving frame 29 via the thread engagement of the male thread portion of the first lens group supporting frame 32 with the female thread portion 29d of the inner flange 29g of the first lens group moving frame 29. Nevertheless, in the present embodiment of the zoom lens barrel, such friction is not produced even if the first and second lens group moving frames 29 and 31 rotate relative to each other at their respective accommodation positions because the low-frictional ring sheet 38 is fixed to the front surface of the shutter pressure plate 37.

The overall movement of the zoom lens barrel 10, having the above described structure, from the accommodation position to a photographing position (a position in the zooming section) will be hereinafter discussed.

When the zoom lens barrel 10 is in an accommodation position, the first lens group supporting frame 32 which is supported by the first lens group moving frame 29, which is biased rearward by the three helical compression springs 30, is retracted to the above described mechanically contacting point P, where the lens pressure ring 32a comes in contact with the low-frictional ring sheet 38 due to the clearance between the first-lens-group accommodation portion C1A1 and the associated follower pin 29f of the first lens group moving frame 29. The second lens group moving frame 31 is also retracted to the above described mechanically contacting point Q, where the second lens group moving frame 31 comes in contact with the third lens frame 39 due to the clearance between the second-lens-group-accommodation end portion C1S2 and the associated follower pin 31f of the second lens group moving frame 31. Furthermore, the third lens frame 39 is retracted to the above described mechanically contacting point R, where the third lens frame 39 comes in contact with the CCD holding frame 13 against the spring force of the helical compression spring 42 with the helical compression spring 42 being in a compressed (contracted) state. With these three mechanical contacts at the mechanically contacting points P, Q and R, the length of the zoom lens barrel 10 in an accommodation position is successfully reduced. When the zoom lens barrel 10 is in an accommodation position, the pair of barrier blades 46 are closed to shut the photographing aperture 45a, since the three rotation transfer faces 22d respectively press the three engaging portions 44a of the barrier drive ring 44 against the spring force of the helical extension spring 49 to rotate the barrier drive ring 44 in a direction to move the two drive projections 44c away from the two engaging projections 46a of the pair of barrier blades 46, respectively.

In the accommodation position of the zoom lens barrel 10, when the rotational ring 20 rotates in a direction to extend the zoom lens barrel 10 relative to the stationary barrel 11, the cam ring 22, which is provided with the three follower pins 22f, and the biasing ring 21, which is provided with the three follower pins 21f, rotate about the optical axis O in accordance with the cam profile of the accommodation groove portion 11a2 of each of the three cam grooves 11a that are formed on an inner peripheral surface of the stationary barrel 11 (see FIG. 28). This rotational movement of the cam ring 22 causes each follower pin 29f and the associated follower pin 31f, which are respectively engaged in the first-lens-group accommodation portion C1A1 of the associated lens-drive cam groove C1 and the second-lens-group-accommodation end portion C1S2 of the same lens-drive cam groove C1, to vary the relative position between the follower pin 29f and the follower pins 31f in a circumferential direction of the cam ring 22 without varying the position of each of the follower pin 29f and the follower pins 31f relative to the cam ring 22 in the optical axis direction (see the transition from (a) to (b) in FIG. 23). Thereafter, each follower pin 21f of the biasing ring 21 and each follower pin 22f of the cam ring 22 enter the position-changing groove portion 11a3, so that the cam ring 22 together with the biasing ring 21 moves forward in the optical axis direction while rotating about the optical axis O. This causes the second lens group moving frame 31 to disengage from the third lens frame 39, and almost at the same time, each follower pin 29f of the first lens group moving frame 29 starts moving rearward in the optical axis direction with respect to the cam ring 22 (see (b) in FIG. 23). As a result, the first lens group moving frame 29 presses the second lens group moving frame 31 rearward in the optical axis direction to move the second lens group moving frame 31 slightly in the rearward direction. The displacement of the second lens group moving frame 31 at this time is very small, and thus is not shown in FIG. 23. In an early stage of this rotation of the cam ring 22 by the position-changing groove portions 11a3 of the stationary barrel 11, the three rotation transfer faces 22d of the cam ring 22 are respectively disengaged from the three engaging portions 44a of the barrier drive ring 44 so that the barrier drive ring 44 is rotated in a direction to open the pair of barrier blades 45 by the spring force of the helical extension spring 49 against the spring force of the two torsion springs 47. Meanwhile, the second lens group moving frame 31 rotates about the optical axis O relative to the first lens group moving frame 29 so that the lens pressure ring 32a fixed to the first lens group supporting frame 32 rotatably slides on the low-frictional ring sheet 38 before and after the opening operation of the pair of barrier blades 46.

Subsequently, further forward movement of each follower pin 21f of the biasing ring 21 and each follower pin 22f of the cam ring 22 in the position-changing groove portion 11a3 (see FIG. 28) causes the second lens group moving frame 31 to start moving rearward in the optical axis direction (see (c) in FIG. 23). Thereafter, the first and second lens group moving frames 29 and 31 move rearward in the optical axis direction with respect to the cam ring 22 as shown in FIG. 23 (see (c) and (d) in FIG. 23). Subsequently, the mechanical contact between the first and second lens group moving frames 29 and 31 is released at the time the first lens group moving frame 29 moves forward in the optical axis direction (see (d) and (e) in FIG. 23). Subsequently, the mechanical contact between the second lens group moving frame 31 and the third lens frame 39 is released, and thereafter each of the three linear guide keys 31a is engaged in the associated one of the four linear guide grooves 29c (see (f) in FIG. 23).

Thereafter, the first and second lens group moving frames 29 and 31 move to the respective wide-angle extremities thereof in the optical axis direction while maintaining the circumferential space therebetween until each follower pin 21f and each follower pin 22f reach the respective wide-angle extremities thereof in the zooming groove portion 11a4 of the associated one of the three cam grooves 11a that are formed on the inner peripheral surface of the stationary barrel 11 (see FIGS. 21F through 21J).

Further rotation of the rotational ring 20 causes each follower pin 21f of the biasing ring 21 and each follower pin 22f of the cam ring 22 to move from the respective wide-angle extremities in the zooming groove portion 11a4 toward the respective telephoto extremities, so that the cam ring 22 rotates about the optical axis O without moving in the optical axis direction. At this stage, if the cam ring 22 rotates in the zooming range (i.e., if each follower pin 29f and each follower pin 31f move in the first-lens-group zooming section C1Z1 and the second-lens-group zooming section C1Z2, respectively), the first and second lens group moving frames 29 and 31 (the first and second lens groups L1 and L2) move in the optical axis direction in accordance with the cam profiles of the first-lens-group zooming section C1Z1 and the second-lens-group zooming section C1Z2, to thereby vary the focal length of the photographing optical system, i.e., to perform a zooming operation. This zooming operation is carried out by manually operating a conventional zoom switch or knob (not shown). Immediately after a release button is depressed, the aforementioned step motor (not shown), which drives the feed screw shaft 41 to move the third lens group L3 (the third lens frame 39), rotates by an amount of rotation corresponding to information on a photographing distance to move the third lens group L3 to bring an object into focus. The shutter unit 36 drives the shutter blades 36a (see FIG. 8, 9 or 10) to open and close in accordance with the information on the object brightness.

Backlash and play between the three follower pins 21f of the biasing ring 21, the three follower pins 22f of the cam ring 22 and the zooming groove portions 11a4 of the three cam grooves 11a of the stationary barrel 11 are removed at the time the motor 18 stops during the time each of the three follower pins 21f and the associated one of the three follower pins 22f are moving in the zooming groove portion 11a4 of the associated one of the three cam grooves 11a, since each follower pin 21f of the biasing ring 21 and the associated one of the three follower pins 22f of the cam ring 22 are pressed against a rear side edge of the associated cam groove 11a and a front side edge of the same cam groove 11a, respectively, over the full range of the cam groove 11a by the spring force of the three compression helical springs 26 as described above.

When the first lens group moving frame 29 moves linearly in the optical axis direction, the first ring 28 also moves in the optical axis direction without varying the position thereof relative to the first lens group moving frame 29 due to the engagement of the three follower pins 28f with the three cam grooves C2 of the cam ring 22, the profiles of which are similar to those of the lens-drive cam grooves C1. At the same time, the first ring 28 and the second ring 27, the respective outer peripheral surfaces of which are exposed to the outside of the zoom lens barrel 10, move together in the optical axis direction since the second ring 27 moves together with the cam ring 22 in the optical axis direction at all times due to the engagement of the three bayonet prongs 27c of the second ring 27 with the three bayonet prongs 24 of the cam ring 22.

On the other hand, when the cam ring 22 rotates in a direction from the zooming section via the preparation section (i.e., in the barrier closing direction), the first and second rings 28 and 27 retract together in the optical axis direction by operations reverse to the above described operations. Subsequently, the first lens group moving frame 29, which supports the first lens group L1, and the second lens group moving frame 31, which supports the second lens group L2, come into contact with each other at their respective rear ends via the three helical compression springs 30. Subsequently, the second lens group moving frame 31 retreats until coming into contact with the third lens frame 39. Subsequently, the second lens group moving frame 31 further retreats until the third lens frame 39 comes into contact with the CCD holding frame 13 against the spring force of the helical compression spring 42, which biases the third lens frame 39 forward. At the same time, the three rotation transfer faces 22d respectively press the three engaging portions 44a of the barrier drive ring 44 against the spring force of the helical extension spring 49 to rotate the barrier drive ring 44 in a direction to close the pair of barrier blades 46 to shut the photographing aperture 45a.

In the present embodiment of the zoom lens barrel 10, as described above, the linear guide grooves 29c, the circumferential recesses 29h and the linear guide keys 31a constitute a guiding mechanism for guiding the second lens group moving frame 31. The second lens group moving frame 31 is rotated relative to the first lens group moving frame 29 with rotation of the cam ring 22 while the zoom lens barrel 10 moves from the accommodation position to a photographing position (the wide-angle extremity). More specifically, during the time the three linear guide keys 31a which are engaged in the three circumferential recesses 29h when the zoom lens barrel 10 is in the accommodation position move from the three circumferential recesses 29h to the three linear guide grooves 29c, respectively. Unlike the illustrated embodiment of the present invention, assuming that the second lens group moving frame 31 is made to move from the accommodation position thereof without being made to rotate similarly to the first lens group moving frame 29, the end of each lens-drive cam groove C1 which corresponds to the second-lens-group-accommodation end portion C1S2 has to be extended in a circumferential direction of the cam ring 22. In other words, unlike the illustrated embodiment of the present invention, if the second lens group moving frame 31 cannot rotate, the position of the end of each cam groove shifts in a direction toward the right from the actual position shown in FIG. 20. However, if the end of each lens-drive cam groove C1 is extended in a circumferential direction of the cam ring 22, the extended end of each lens-drive cam groove C1 will interfere with the adjacent other lens-drive cam groove C1 as can be understood from FIG. 20. This problem can be prevented from occurring if the diameter of the cam ring 22 is simply increased. However, it is not desirable to increase the diameter of the cam ring 22 since the diameter of the zoom lens barrel 10 becomes greater if the diameter of the cam ring 22 is increased.

On the other hand, since the amount of movement of the second lens group moving frame 31 between the accommodation position and the wide-angle extremity is small as can be seen from FIGS. 8 and 9, the practical length of each cam groove which is necessary for operation of the second lens group moving frame 31 in the vicinity of the accommodation position thereof can be shorter than the practical length of each cam groove which is necessary for operation of the first lens group moving frame 29 in the vicinity of the accommodation position thereof.

Accordingly, in the present embodiment of the zoom lens barrel, as described above with reference to FIGS. 21 and 22, the range of each lens-drive cam groove C1 which is used for controlling the movement of the second lens group moving frame 31 in the vicinity of the accommodation position thereof is shortened so as not to interfere with another lens-drive cam groove C1, by making the second lens group moving frame 31 rotate with the rotation of the cam ring 22 when the zoom lens barrel 10 is in the vicinity of the accommodation position thereof.

Specifically, in the structure of the present embodiment of the zoom lens barrel wherein the first and second lens group moving frames 29 and 31 share the three lens-drive cam grooves C1, and wherein the amount of movement of the first lens group moving frame 29 from the accommodation position to the start point of the zooming range (i.e., the wide-angle extremity) is large (for instance, the first lens group L1, which is positioned at its rearmost position in the optical axis direction when in the accommodation position, is positioned at the frontmost position in the optical axis direction when in the wide-angle extremity since the amount of movement of the first lens group L1 from the accommodation position to the wide-angle extremity is much greater than that from the wide-angle extremity to the telephoto extremity), there is a tendency for the length of each lens-drive cam groove C1 to be long. Accordingly, it is desirable that the range of a portion (C1A2) of each cam groove (C1) which is positioned at the tail end the cam groove to be used for accommodating the second lens group moving frame 31 be as short as possible, much shorter than the range of another portion of the same cam groove (C1) which is used for moving the first lens group L1 (also for moving the second lens group L2 to perform zooming operation). In other words, if the angle of rotation of the second lens group moving frame 31 in the accommodation position is increased by rotation of the cam ring 22, the length of a portion (C1A2) of each cam groove (C1) which is used for accommodating the second lens group moving frame 31 can be shortened accordingly, so that another portion of the same cam groove can be lengthened by the same amount as the shortened length. This makes it possible to increase the angle of rotation of the cam ring 22 from the accommodation position to the telephoto extremity while maintaining the shape of the cam grooves which are designed not to interfere with one another (See FIGS. 12 through 15). Consequently, the optical performance of the zoom lens barrel 10 is improved, operations of the zoom lens barrel 10 are stabilized, and a high degree of flexibility in design of the photographing optical system of the zoom lens barrel 10 is achieved.

As shown in FIG. 2, the shutter unit 36 is supported within the second lens group moving frame 31, the second lens group moving frame 31 being rotated in the vicinity of the accommodation position thereof due to the above described reason. The flexible PWB F for supplying a drive signal to the shutter unit 36 is connected to the shutter unit 36 as shown in FIGS. 8 through 10. Unlike the illustrated embodiment of the present invention, if the shutter unit 36 and the second lens group moving frame 31 are fixed to each other, the flexible PWB F may be twisted if the second lens group moving frame 31 can rotate largely. Furthermore, the pair of linear guide rods 40 and the feed screw shaft 41 (see FIG. 1) for driving the third lens group L3 are disposed in a space behind the second lens group moving frame 31 where the flexible PWB F extends. Due to this structure, providing that the shutter unit 36 rotates about the optical axis O, there would be a possibility of the flexible PWB F interfering with the pair of linear guide rods 40 and the feed screw shaft 41.

When the zoom lens barrel 10 is in the accommodation position as shown in FIG. 8, the pair of linear guide rods 40 and the feed screw shaft 41, which are fundamental elements of a focusing mechanism for driving the third lens group L3 to perform a focusing operation, partly enter into a cutoff portion 36r (see FIGS. 5 and 7), formed on the shutter unit 36 so that the shutter unit 36 has a substantially D-shaped cross section, via the second cutout portion 31e of the second lens group moving frame 31. This structure makes effective use of an inner space of the zoom lens barrel 10 when the zoom lens barrel 10 is in the accommodation position, thus contributing to miniaturization of the zoom lens barrel 10. However, if the shutter unit 36 rotates when the zoom lens barrel 10 is in the accommodation position, the shutter unit 36 may interfere with the pair of linear guide rods 40 and the feed screw shaft 41.

To prevent the above-described problems from occurring, the present embodiment of the zoom lens barrel 10 is constructed so that the shutter unit 36 which is positioned in the second lens group moving frame 31 does not rotate even if the second lens group moving frame 31 rotates when the zoom lens barrel 10 is in the accommodation position. Specifically, although the shutter support ring 35 is prevented from moving in the optical axis direction in the second lens group moving frame 31 due to a rear end wall 31p (see FIGS. 5 and 7) and the shutter presser plate 37 which is attached to the opened front end of the second lens group moving frame 31 (i.e., close to the front end of the annular recess 31c), the shutter support ring 35 is fitted at the circular aperture 35d thereof on the cylindrical portion 31b to be freely rotatable about the optical axis O with respect to the second lens group moving frame 31. Moreover, the linear guide key 35e which is formed at the front of the support member 35b is movable in a circumferential direction thereof in a third cutout portion 31q (see FIGS. 2 and 4 through 7) which is elongated in a circumferential direction of the shutter support ring 35. Furthermore, the shutter support ring 35 is loosely fitted in the annular recess 31c to be freely rotatable about the optical axis O with respect to the second lens group moving frame 31 with the cylindrical portion 31b being fitted in the circular aperture 35d and with the flexible PWB fixing member 35c extending, through the rear end wall 31p of the second lens group moving frame 31 through the first cutout portion 31d. Due to this structure, the shutter support ring 35 is supported by the second lens group moving frame 31 to be rotatable by a predetermined angle of rotation relative to the second lens group moving frame 31 even though the shutter support ring 35 moves together with the second lens group moving frame 31 in the optical axis direction.

The linear guide key 35e is engaged in the aforementioned one of the four linear guide grooves 29c (hereinafter referred to as "linear guide groove 29c-α" in which none of the three linear guide keys 31a are engaged) to be freely and slidably movable therein in the optical axis direction. Since the first lens group moving frame 29 is linearly guided in the optical axis direction without rotating about the optical axis O, the shutter support ring 35 is linearly guided in the optical axis direction without rotating about the optical axis O via the engagement of the linear guide key 35e with the linear guide groove 29c-α. The linear guide groove 29c-α is different from the other three linear guide grooves 29c in that the linear guide groove 29c-α does not have the circumferential recesses 29h that each of the other three linear guide grooves 29c has. Namely, the linear guide groove 29c-α extends from the rear end to the front end with a constant width in the optical axis direction (see FIGS. 24 and 25).

The shutter support ring 35, the linear guide key 35e and the linear guide groove 29c-α constitute a shutter unit guide mechanism.

Due to the above described structure (shutter unit guide mechanism) supporting the shutter unit 36, the shutter unit 36, which is positioned in the second lens group moving frame 31, moves in the optical axis direction without rotating about the optical axis O regardless of whether the second lens group moving frame 31 rotates relative to the first lens group moving frame 29. Therefore, even if the angle of rotation of the second lens group moving frame 31 in the vicinity of the accommodation position thereof is large, neither the shutter unit 36 nor the flexible PWB F is rotated about the optical axis O. Accordingly, there is no possibility of the shutter unit 36 nor the flexible PWB F interfering with either the pair of linear guide rods 40 or the feed screw shaft 41, and there is also no possibility of the flexible PWB F being twisted. Furthermore, the first cutout portion 31d, through which the flexible PWB fixing member 35c extends through the rear end wall 31p of the second lens group moving frame 31 rearwards, is elongated in a circumferential direction of the second lens group moving frame 31 to have a circumferential length corresponding to the maximum angle of rotation of the second lens group moving frame 31. Therefore, the flexible PWB F does not interfere with the second lens group moving frame 31 either. Consequently, a large angle of rotation of the second lens group moving frame 31 between the accommodation position and the wide-angle extremity can be ensured without any problems with the shutter unit 36 interfering with other members of the zoom lens barrel 10 and without the flexible PWB F of the shutter unit 36 being twisted or interfering with other members of the zoom lens barrel 10.

As can be understood from the above-description, in a lens barrel which incorporates a shutter unit having a flexible printed wiring board, the optical performance of the lens barrel is improved, operations of the lens barrel are stabilized, and a high degree of flexibility in design of the optical system of the lens barrel is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:
   an optical system including a front lens group and a rear lens group;
   a front lens frame which supports said front lens group, and is guided linearly in an optical axis direction without rotating about said optical axis;
   a rear lens frame which supports said rear lens group;
   a lens frame drive mechanism for driving said front lens frame and said rear lens frame, wherein said lens frame drive mechanism allows said rear lens frame to rotate relative to said front lens frame when said front lens group and said rear lens group are in respective accommodation positions, and moves said front lens group and said rear lens group together in said optical axis direction while preventing said front lens frame and said rear lens frame from rotating relative to each other when said front lens group and said rear lens group are in respective photographing ranges excluding said respective accommodation positions;
   a shutter unit having a shutter and a flexible printed wiring board via which a drive signal is transmitted to said shutter, said shutter unit being positioned in said rear lens frame to be rotatable relative to said rear lens frame and to be movable together with said rear lens frame in said optical axis direction; and
   a shutter unit guide mechanism for linearly guiding said shutter unit in said optical axis direction without rotating said shutter unit regardless of whether said rear lens frame rotates relative to said front lens frame.

2. The lens barrel according to claim 1, wherein said front lens frame is positioned around said rear lens frame, said shutter unit guide mechanism comprising:
   a shutter support ring which supports said shutter unit, said shutter support ring being supported in said rear lens frame to be freely rotatable;
   a linear guide projection which extends outwards in a radial direction from said shutter support ring; and
   a linear guide groove which is formed on an inner peripheral surface of said front lens frame and in which said linear guide projection is engaged to be movable along said linear guide groove.

3. The lens barrel according to claim 2, wherein a front end of said rear lens frame in said optical axis direction is open;
   wherein said rear lens frame includes a movement restriction surface which restricts a rearward movement of said shutter support ring in said optical axis direction in said rear lens frame; and
   wherein said lens barrel further includes a shutter pressure plate which is attached at said open front end of said rear lens frame to prevent said shutter unit from moving forward in said optical axis direction with respect to said rear lens frame.

4. The lens barrel according to claim 2, wherein said rear lens frame comprises a cylindrical portion which is positioned in said rear lens frame about said optical axis, said shutter support ring having a circular aperture which is rotatably provided around an outer peripheral surface of said cylindrical portion.

5. The lens barrel according to claim 2, wherein said shutter support ring comprises a flexible printed wiring board fixing member which supports said flexible printed wiring board; and wherein said rear lens frame includes a through-hole through which said flexible printed wiring board fixing member projects from said rear lens frame regardless of a variation in rotational position of said rear lens frame about said optical axis with respect to said front lens frame.

6. The lens barrel according to claim 1, wherein said optical system comprises a focusing lens group positioned behind said rear group and guided in said optical axis direction, said lens barrel further including a focusing mechanism for driving said focusing lens group in said optical axis direction in accordance with object-distance information;

wherein at least a portion of said focusing mechanism enters inside a portion of said rear lens frame when said front and rear lens groups are in said respective accommodation positions; and wherein said shutter unit is formed so that said shutter unit does not interfere with said portion of said focusing mechanism when said focusing mechanism enters inside a portion of said rear lens frame.

7. The lens barrel according to claim 6, wherein said shutter unit comprises a cutoff portion which enables said shutter unit not to interfere with said portion of said focusing mechanism.

8. The lens barrel according to claim 1, wherein said lens frame drive mechanism comprises:

a first cam follower formed on said front lens frame;

a second cam follower formed on said rear lens frame;

a cam ring including a cam groove in which said first cam follower and said second cam follower are engaged, said cam groove including a photographing section for moving said first cam follower and said second cam follower to move said front lens frame and said rear lens frame in said optical axis direction in said respective photographing ranges, and an accommodation section for moving said first cam follower and said second cam follower to move said front lens frame and said rear lens frame to said respective accommodation positions behind said respective photographing ranges; and a guiding mechanism, provided between said front lens frame and said rear lens frame, for allowing said rear lens frame to rotate relative to said front lens frame when said cam ring is driven to rotate with said front lens frame and said rear lens frame being in the vicinities of said respective accommodation positions thereof, respectively, and for prohibiting said rear lens frame from rotating relative to said front lens frame while allowing said rear lens frame to move only in said optical axis direction relative to said front lens frame when said cam ring is driven to rotate with said front lens frame and said rear lens frame being in said respective photographing ranges excluding said vicinities of said respective accommodation positions.

9. The lens barrel according to claim 8, wherein said front lens frame is positioned around said rear lens frame, said shutter unit guide mechanism comprising:

a shutter support ring which supports said shutter unit so that the shutter unit can freely rotate in said rear lens frame;

a first linear guide projection which extends outwards in a radial direction from said shutter support ring; and a first linear guide groove which is formed on in an inner peripheral surface of said front lens frame said first linear guide projection being engaged in said linear guide projection to be movable along said first linear guide groove;

wherein said guiding mechanism comprises:

a second linear guide groove formed on said front lens frame to extend parallel to said optical axis, a front end of said second linear guide groove being formed as a wide-width engaging portion having a greater width than another portion of said second linear guide groove in a circumferential direction of said front lens frame; and a second linear guide projection formed on said rear lens frame to be engaged in said wide-width engaging portion and said another portion of said second linear guide groove when said front lens frame and said rear lens frame are in the vicinities of said respective accommodation positions thereof and in said respective photographing ranges, respectively;

wherein said first linear guide groove and said second linear guide groove are formed on an inner peripheral surface of said front lens frame at different circumferential positions thereon.

10. The lens barrel according to claim 8, wherein said rear lens frame rotates with a rotation of said cam ring when positioned in the vicinity of said accommodation position thereof.

11. The lens barrel according to claim 1, wherein said lens barrel comprises a zoom lens barrel; and wherein said lens frame drive mechanism moves said front lens group and said rear lens group to perform a zooming operation in said photographing ranges.

* * * * *